United States Patent
Wilson

(10) Patent No.: US 11,300,184 B1
(45) Date of Patent: Apr. 12, 2022

(54) VARIABLE OUTPUT TRANSMISSION

(71) Applicant: Trinity Innovative Solutions, LLC, Mead, WA (US)

(72) Inventor: Brandt Peter Wilson, Post Falls, ID (US)

(73) Assignee: Trinity Innovative Solutions, LLC, Mead, WA (US)

( * ) Notice: Subject to any disclaimer, the term of this patent is extended or adjusted under 35 U.S.C. 154(b) by 0 days.

(21) Appl. No.: 17/099,097

(22) Filed: Nov. 16, 2020

(51) Int. Cl.
*F16H 3/70* (2006.01)
*F16H 3/72* (2006.01)
(Continued)

(52) U.S. Cl.
CPC .............. *F16H 3/70* (2013.01); *F03D 15/00* (2016.05); *F16H 3/724* (2013.01); *F16H 59/141* (2013.01);
(Continued)

(58) Field of Classification Search
None
See application file for complete search history.

(56) References Cited

U.S. PATENT DOCUMENTS 4,973,295 A * 11/1990 Lee ........................... F16H 3/72
475/153
5,474,504 A 12/1995 Bay et al.
(Continued)

FOREIGN PATENT DOCUMENTS

CN 1147670 4/2004
CN 106515987 A * 3/2017
(Continued)

OTHER PUBLICATIONS

Ashok, Sylvester V. et al., "Variable Speed Transmission using Planetary Gear System for High Speed Rotorcraft Application", American Helicopter Society 66th Annual Forum, Phoenix [retrieved Dec. 14, 2020], Retrieved from the Internet <shorturl.at/ezHR7>., May 2010, 14 pages.
(Continued)

*Primary Examiner* — Dirk Wright
(74) *Attorney, Agent, or Firm* — FIG. 1 Patents

(57) ABSTRACT

A transmission is described. The transmission employs a main input sprocket configured to be driven by a drive system of the apparatus implementing the transmission. The main input sprocket is disposed on and coupled to a main axle of the transmission. The transmission further includes an output gear that is configured to float on the main axle and is connected to a driven output component of the apparatus implementing the transmission. By floating on the main axle, the output gear can rotate at a rate that differs from a rotational rate of the main input sprocket. To control a rate at which the output gear rotates relative to the main input sprocket, the transmission employs a reference carrier floating on the main axle. A rotational rate of the reference carrier dictates an amount of torsional relief from the main input sprocket to the output gear. A rate at which the reference carrier rotates about the main axle is controlled by a control system of the transmission, which may be implemented as a computer-based control system, a mechanical feedback-based control system, and combinations thereof.

20 Claims, 15 Drawing Sheets

(51) Int. Cl.
*F16H 59/24* (2006.01)
*F16H 59/14* (2006.01)
*F16H 59/44* (2006.01)
*F16H 61/664* (2006.01)
*F03D 15/00* (2016.01)
*F16H 59/40* (2006.01)

(52) U.S. Cl.
CPC ............ *F16H 59/24* (2013.01); *F16H 59/40* (2013.01); *F16H 59/44* (2013.01); *F16H 61/664* (2013.01); *F05B 2260/40311* (2013.01); *F16H 2061/6644* (2013.01)

(56) References Cited

U.S. PATENT DOCUMENTS

| | | | |
|---|---|---|---|
| 6,447,418 B1* | 9/2002 | Fleytman | B60K 17/35 475/7 |
| 6,527,671 B2* | 3/2003 | Paalasmaa | F16H 3/72 477/104 |
| 6,537,169 B1 | 3/2003 | Morii et al. | |
| 6,599,213 B2* | 7/2003 | Fleytman | B60K 17/35 180/248 |
| 6,645,112 B1* | 11/2003 | Fleytman | B60K 17/3462 180/249 |
| 7,041,022 B2* | 5/2006 | Bock | B62D 5/008 475/339 |
| 7,115,066 B1 | 10/2006 | Lee | |
| 7,247,111 B2* | 7/2007 | Yamanaka | B62D 5/008 475/2 |
| 7,479,089 B2* | 1/2009 | Yamanaka | B62D 5/008 475/344 |
| 9,085,225 B2* | 7/2015 | Halwes | F16H 1/16 |
| 9,243,700 B1* | 1/2016 | DeBoth | F16H 37/0826 |
| 9,254,890 B2* | 2/2016 | Deleval | B62M 6/55 |
| 10,180,178 B2* | 1/2019 | Boiger | F16H 3/724 |
| 2012/0010036 A1* | 1/2012 | Moeller | B62M 6/55 475/149 |
| 2017/0219066 A1* | 8/2017 | Yamamoto | B62M 6/55 |
| 2017/0259883 A1* | 9/2017 | Yamamoto | F16H 3/725 |
| 2020/0115003 A1* | 4/2020 | Keppens | B60L 7/10 |

FOREIGN PATENT DOCUMENTS

| | | | | |
|---|---|---|---|---|
| CN | 107054545 A | * | 8/2017 | |
| DE | 102004022789 A1 | * | 12/2005 | ............ B62M 6/60 |
| DE | 202007002366 U1 | * | 5/2007 | .......... B62M 11/145 |
| DE | 102012021292 A1 | * | 4/2014 | ............ B60K 6/547 |
| EP | 2878527 A1 | * | 6/2015 | ............ B62M 11/18 |
| GB | 2402450 | | 8/2004 | |
| GB | 2429342 A | * | 2/2007 | ............ F16H 3/724 |
| KR | 101033858 B1 | * | 5/2011 | ............ F16H 3/724 |
| KR | 20120093569 A | * | 8/2012 | |
| KR | 101760626 B1 | * | 7/2017 | |
| KR | 20180075771 A | * | 7/2018 | ............ B62M 6/90 |
| WO | WO-1999024736 | | 5/1999 | |
| WO | WO-2014096888 | | 6/2014 | |
| WO | WO-2015063050 A1 | * | 5/2015 | ............ B60K 6/48 |
| WO | WO-2018072277 A1 | * | 4/2018 | ............ B62M 6/60 |

OTHER PUBLICATIONS

Gao, Yimin et al., "A Torque and Speed Coupling Hybrid Drivetrain—Architecture, Control, and Simulation", IEEE Transactions on Power Electronics, vol. 21, No. 3 [retrieved Dec. 14, 2020], Retrieved from the Internet <https://ieeexplore.ieee.org/document/1629014>., May 2006, pp. 741-748.

* cited by examiner

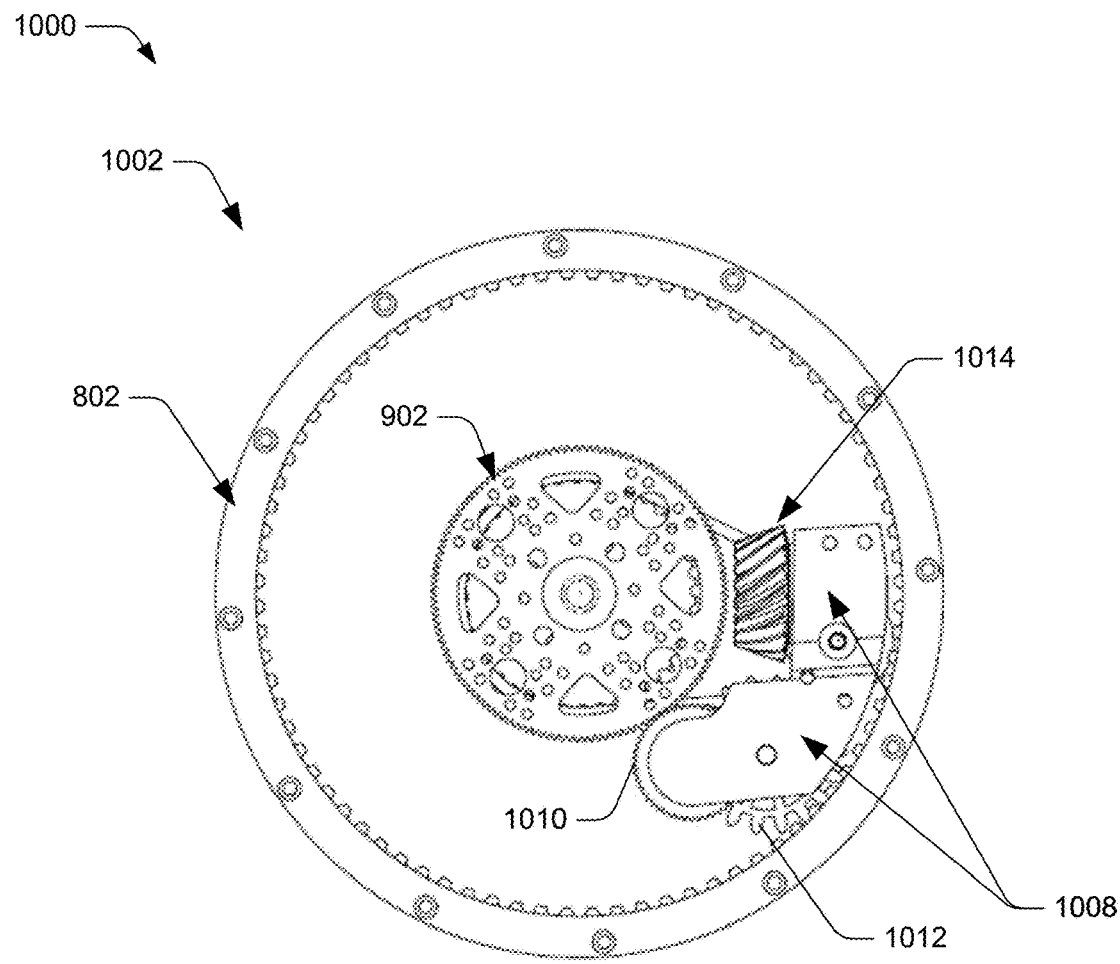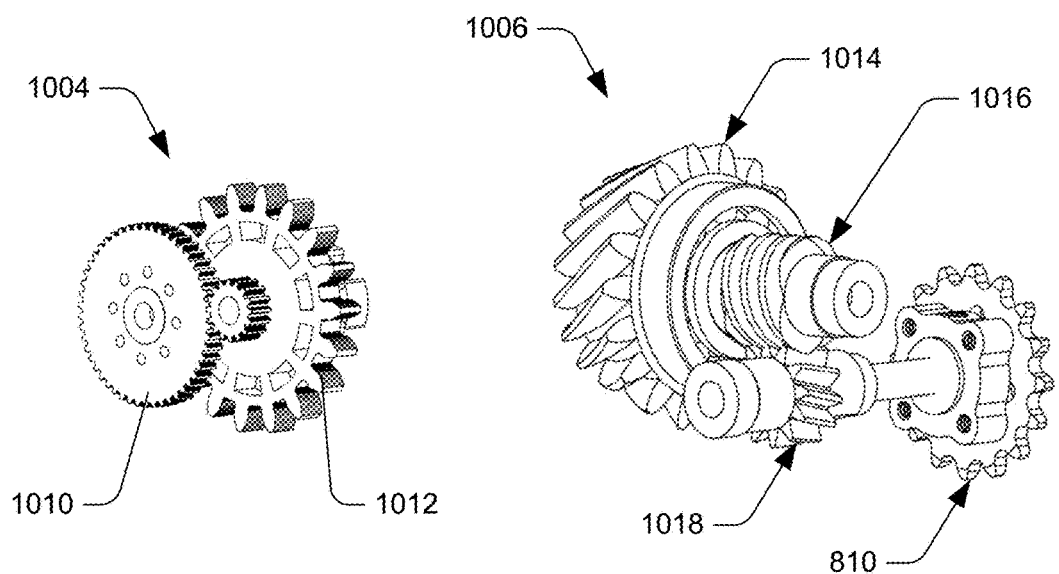
Fig. 10

VARIABLE OUTPUT TRANSMISSION

BACKGROUND

Transmissions are widely used in a variety of applications to control the output of a drive system to an output component, such as controlling the output of an internal combustion engine to an aircraft propeller, output of pedals to a wheel of a bicycle, natural forces exerted on a turbine blade to a turbine output gear, and so forth. Conventional transmissions provide a range of speed and torque outputs for the output component, such as by employing a plurality of different gears and locking and unlocking various ones of the different gears to achieve a desired output speed or output torque. However, conventional transmissions are limited in their ranges of possible output speeds and possible output torques by a number of different gear ratios included in the transmission.

Conventional transmissions are further limited in transitioning between different gear ratios in a step-wise manner, where one gear ratio must be disengaged before engaging a different gear ratio. For instance, a ten-speed bicycle has a maximum output torque that is restricted by a size of its lowest gear and a maximum output speed that is restricted by a size of its highest gear, and switching between gears is performed in steps (e.g., via a chain disengaging from one bike gear before engaging with another bike gear).

To address these conventional shortcomings, continuously variable transmissions have been designed to enable seamless transitions through a continuous range of different gear ratios. To do so, some conventional continuously variable transmissions employ conical pulleys that are configured to individually vary in diameter and are connected to one another by a belt or chain, where changing the diameter of one or more of the variable diameter pulleys alters an effective gear ratio of the transmission. In addition to variable diameter pulley systems, other conventional continuously variable transmissions include friction disk transmissions, hydrostatic transmissions, and toroidal transmissions. However, these conventional continuously variable transmissions involve changing arrangement of various components with respect to one another during operation, which consequently exposes the transmission to wear, fatigue, and power loss. Further, conventional continuously variable transmissions are often of a size that prohibits incorporation into smaller apparatuses.

SUMMARY

To overcome these problems, a variable output transmission is described. The variable output transmission described herein employs a main input sprocket configured to be driven by a drive system of the apparatus implementing the variable output transmission. The main input sprocket is disposed on and coupled to a main axle of the transmission. The transmission further includes an output gear that is configured to float on the main axle and is connected to a driven output component of the apparatus implementing the transmission. By floating on the main axle, the output gear can rotate at a rate that differs from a rotational rate of the main input sprocket. To control a rate at which the output gear rotates relative to the main input sprocket, the transmission employs a reference carrier floating on the main axle.

A rotational rate of the reference carrier dictates an amount of torsional relief from the main input sprocket to the output gear. A rate at which the reference carrier rotates about the main axle is controlled by a control system of the transmission, which may be controlled according to a variety of different manners, including computer-based control systems, mechanical feedback-based control systems, and combinations thereof. As described in further detail below, the transmission is thus configured to achieve, and instantaneously transition among, an infinite range of gear ratios.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 10 depicts an example of a feedback drive assembly of the transmission of FIG. 1 in accordance with one or more implementations.

DETAILED DESCRIPTION

Overview

Figure 1:
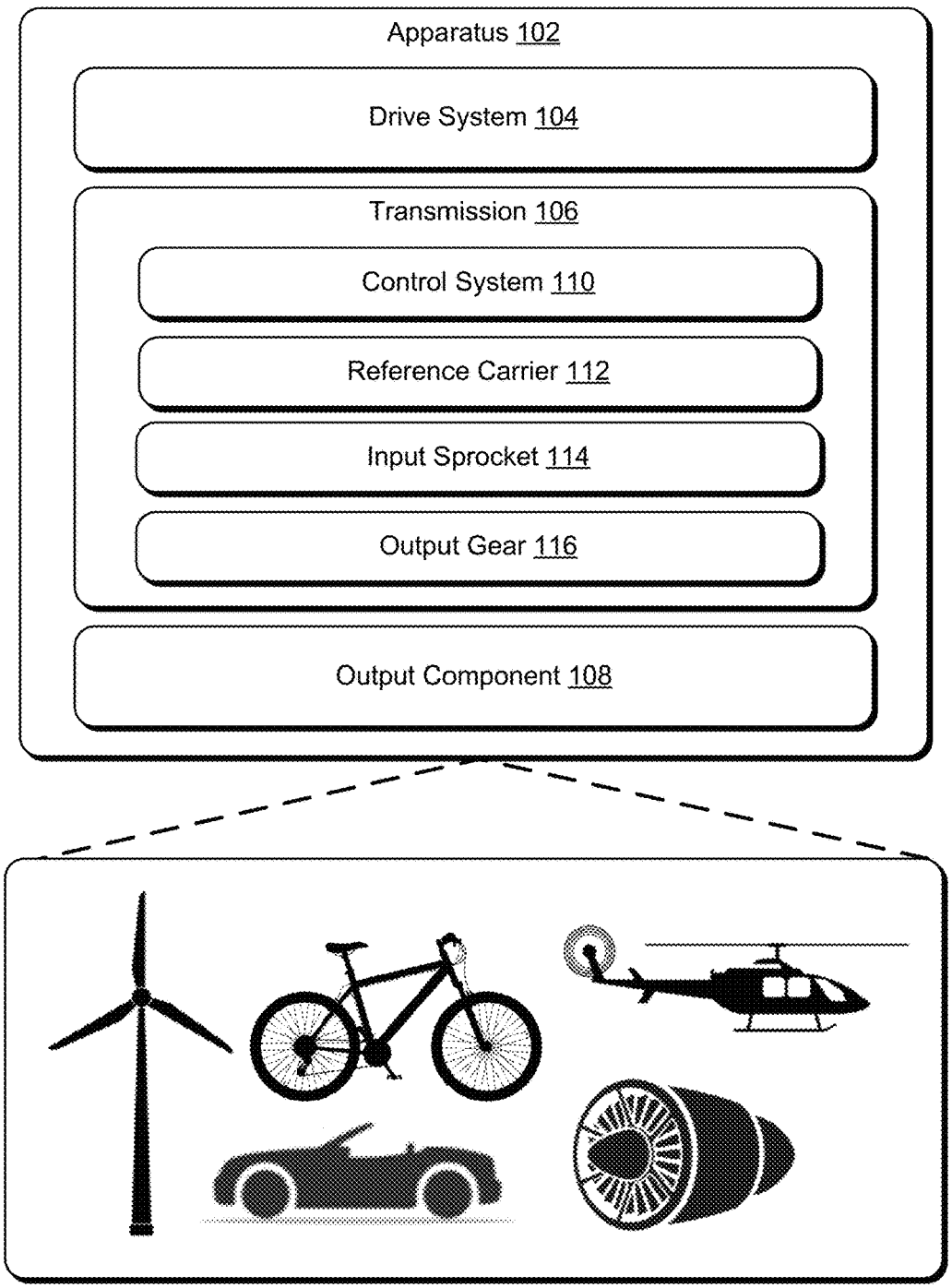
FIG. 1 is an illustration of an example implementation of an apparatus incorporating a transmission and techniques for controlling the transmission described herein.

Transmissions are implemented by a range of different apparatus types, and are configured to enable adjustment of a gear ratio between a driving component of the apparatus and a driven component of the apparatus. For example, a conventional automobile transmission is designed to adjust a gear ratio between an input sprocket driven by an internal combustion engine of the automobile and a driveshaft connected to driving wheels of the automobile. In conventional automobile transmissions, both manual and automatic, the automobile's available gear ratios are constrained by a number of fixed gears included in the transmission.

For instance, a conventional six-speed automobile transmission includes six fixed Input:Output gear ratios (e.g., 3:1 for first gear; 2:1 for second gear; 1.4:1 for third gear; 1:1 for fourth gear; 0.85:1 for fifth gear; and 0.5:1 for sixth gear), where the "Input" number in the gear ratio represents a number of revolutions of the automobile's engine and the "Output" number represents a number of revolutions for the transmission's output. In this manner, conventional transmissions enable adjusting an amount of torque and rotational speed of a driven component without requiring adjustment of an amount of output provided by the drive system by switching between different gears.

However, switching between different gears often requires disengaging one gear before a different gear can be engaged, which is inefficient and wastes power output by the drive system while gears are disengaged. Furthermore, conventional transmissions that require disengaging and reengaging gears do so by changing an arrangement of transmission components relative to one another, resulting in wear and fatigue and reducing a longevity of the transmission. As another drawback, conventional transmissions are limited to transitioning between the specific fixed gear ratios enabled by the transmission's design. For instance, continuing the previous example where a conventional automobile transmission offers a 3:1 first gear ratio and a 2:1 second gear ratio, such a conventional transmission is unable to achieve a gear ratio falling between the first and second gear ratios (e.g., unable to achieve a 2.5:1 gear ratio).

To address these shortcomings of conventional fixed-gear ratio transmissions, continuously variable transmissions have been designed to enable seamless transitions through a range of different gear ratios. In order to achieve this seamless transition through different gear ratios, such as achieving the 2.5:1 gear ratio between the first and second gear ratios of the conventional fixed-fear ratio transmission described above, some conventional continuously variable transmissions employ conical pulleys. These conical pulleys implemented by conventional continuously variable transmissions are connected to one another by a belt, chain, or other linkage, and the pulleys are configured to individually vary in diameter, such that changing the diameter of one pulley alters an effective gear ratio of the transmission. As an alternative to conical pulley continuously variable transmissions, other conventional continuously variable transmission configurations include friction disk transmissions, hydrostatic transmissions, toroidal transmissions, and so forth.

However, conventional continuously variable transmissions involve changing arrangement of various transmission components with respect to one another during operation, similar to conventional fixed-gear ratio transmissions. Consequently, conventional continuously variable transmissions suffer from the drawback of wear and fatigue caused by changing arrangement of transmission components relative to one another during operation, which negatively affects longevity and reliability of conventional continuously variable transmissions. As another drawback, conventional continuously variable transmissions require inclusion of components that are of a prohibitively large size, which precludes incorporating conventional continuously variable transmissions into apparatuses having small form-factors.

In contrast to conventional transmission designs that require physical space to enable adjustment of transmission components relative to one another, to include different size gears for fixed-gear ratios, to enable displacement of transmission components to change gear ratios, and so forth, the transmission described herein achieves a smaller footprint by omitting these conventional physical space requirements. For instance, as described in further detail below, the transmission described herein does not require incorporation of cone assemblies (e.g., conical pulleys), specially designed shafts (e.g., shafts or axles with splines, grooves, hollow portions, and the like), or other components otherwise required by conventional transmission designs. Advantageously, components of the transmission described herein do not change arrangement relative to one another during operation, thereby increasing the transmission's durability relative to conventional transmissions by avoiding the wear and fatigue involved with changing component arrangements relative to one another.

In this manner, the transmission described herein increases an efficiency of an apparatus implementing the transmission by consistently maintaining engagement of the apparatus' drive system with one or more output components of the apparatus. This increased efficiency enabled by the transmission described herein contrasts with a reduced efficiency experienced by the same apparatus when employing a conventional transmission that disengages the drive system from a driven component when transitioning between different gear ratios.

Although described herein with respect to example implementations of the transmission being embodied in a vehicle where the drive system is configured as an internal combustion engine, human-powered pedals, and so forth, the example implementations do not exhaustively describe possible implementations of the transmission. For instance, in alternative implementations, the transmission may be implemented by an apparatus where the drive system is representative of one or more natural forces (e.g., wind, water current, etc.) exerting on the apparatus. In this manner, the transmission is configured to be driven by any manner of drive system, such as an electronically-powered drive system, one or more natural forces, manual (e.g., human) power, an engine, combinations thereof, and the like.

To enable these advantages, the transmission employs a main input sprocket disposed on a main axle of the transmission, where the main input sprocket is coupled to, and configured to be actuated by, a drive system of the apparatus implementing the continuously variable transmission. In implementations, the main input sprocket is affixed to the main axle, thereby enabling the drive system of the apparatus to cause rotation of the main axle. By configuring the transmission in the manner described herein, the main axle may be configured as a solid rod that does not require any specialized splines, grooves, hollow portions, or other specialized design features.

The transmission additionally includes an output gear that is connected to a driven output component of the apparatus implementing the transmission (e.g., a propeller, a wheel, a driveshaft, and the like). The output gear is configured to float on the main axle (e.g., via one or more bearings), such that a rotational rate of the main input sprocket and the main axle can differ from a rotational rate of the output gear.

In order to control a rate at which the output gear rotates relative to a rotational rate of the main input sprocket, the transmission further includes a reference carrier disposed on the main axle, in between the main input sprocket and the output gear. The reference carrier is configured to float on the main axle, such that a rotational rate of the reference carrier can differ from one or more of a rotational rate of the main input sprocket, a rotational rate of the main axle, or a rotational rate of the output gear. The reference carrier includes an input sun gear that is fixed to the main axle, with one or more input/output gear clusters configured as planetary clusters that orbit the input sun gear. As described in further detail below, by configuring the transmission in the manner described herein, the entire transmission may be disposed on a single axle, thus substantially reducing a physical space requirement of the transmission relative to conventional transmission designs. However, the transmission described herein is not so limited to disposition on a single axle, and is disposed on a plurality of different axles in accordance with one or more implementations.

The input/output gear clusters are additionally coupled to the output gear of the transmission. In this manner, a rotational rate of the reference carrier dictates an amount of torsional relief provided by the transmission from the main input sprocket to the output gear. For instance, in accordance with one or more implementations, restricting movement of the reference carrier achieves a highest rotational rate of the output gear, while increasing a rotational rate of the reference carrier increases an amount of torque transferred from the main input sprocket to the output gear, independent of a change in a rotational rate of the main input sprocket.

A rate at which the reference carrier rotates about the main axle is controlled by a control system of the transmission, which may be controlled according to a variety of different manners, including computer-based control systems, mechanical feedback-based control systems, and combinations thereof.

For instance, in an example implementation where the reference carrier control system of the transmission is configured as a purely mechanical feedback-based control system, a rotational rate of an output component of the apparatus driven by the output gear of the transmission dictates a rotational rate of the reference carrier. Notably, the rotational rate of the reference carrier is configured to be independent of a rotational rate of the main input sprocket. In such example implementations, the mechanical feedback provides instantaneous feedback that permits the transmission to instantaneously adjust an amount or torque transferred from the main input sprocket to the output gear based on a rotational rate of an output component of the apparatus implementing the transmission. In contrast to computer-based control systems, such a mechanical feedback-based control system avoids computational lag otherwise involved with ascertaining the rotational rate of the output component of the apparatus and determining an appropriate adjustment of the reference carrier's rotational rate.

Further, the transmission described herein is configured to achieve an infinite range of gear ratios, where an upper limit of the transmission's available gear ratios is constrained by sizes and tolerances of its components (e.g., the input/output gear clusters of the reference carrier). Significantly, the configuration of the transmission described herein does not constrain a lower limit of the transmission's available gear ratios. Stated mathematically, the transmission described herein can achieve any gear ratio 1:X, where X>0.

In the following description, an example environment is first described that may employ the transmission and transmission control techniques described herein. Example implementation details and procedures are then described which may be performed in the example environment as well as other environments. Performance of the example procedures is not limited to the example environment and the example environment is not limited to performance of the example procedures.

Example Environment

FIG. 1 illustrates an environment 100 in an example implementation of an apparatus 102 configured to employ a transmission and control operation of the transmission using one or more techniques described herein. Apparatus 102 is representative of any mechanism, device, machinery, and the like, configured to employ a transmission to control transmission of power from a drive system of the apparatus 102 to an output component of the apparatus 102. For instance, in the illustrated environment 100, the apparatus 102 may be configured as a motor vehicle (e.g., a car, a motorcycle, and the like), an aircraft (e.g., a helicopter, a drone, an airplane, and so forth), a bicycle, or a turbine engine. The example configurations of apparatus 102 as illustrated in the environment 100, however, are merely representative of possible configurations of apparatus 102 and do not exhaustively illustrate all possible configurations.

Apparatus 102 is illustrated as including a drive system 104, a transmission 106, and an output component 108. The drive system 104 is representative of one or more components of the apparatus 102 configured to generate power (e.g., a power plant of the apparatus 102). For instance, when apparatus 102 is configured as a motor vehicle (e.g., a car or a motorcycle), the drive system 104 is configured as an internal combustion engine, one or more batteries, combinations thereof, and the like. As a corollary, the output component 108 is representative of one or more components of the apparatus 102 configured to be driven by the drive system 104. For instance, the output component 108 is representative of one or more wheels, one or more propellers, one or more axles, combinations thereof, and so forth.

The transmission 106 is representative of functionality of the apparatus 102 to control an amount of power output by the drive system 104 to the output component 108, independent of a change in power output by the drive system 104. For instance, in an example scenario where the drive system 104 is configured to output power in the form of rotational motion of a component of the drive system 104, the transmission 106 is configured to regulate an amount of the power that is transferred to the output component 108 while the rotational motion of the component of the drive system 104 remains constant. To do so, the transmission 106 employs at least a control system 110, a reference carrier 112, an input sprocket 114, and an output gear 116. The control system 110 is representative of functionality of the transmission 106 to regulate a rotational rate of the reference carrier 112.

By increasing the rotational rate of the reference carrier 112, the control system 110 reduces a gear ratio of the transmission and increases torque transferred to the output gear 116, where the input sprocket 114 is connected to the drive system 104 and the output gear 116 is connected to the output component 108. Conversely, by reducing the rotational rate of the reference carrier 112, the control system 110 increases an amount of power transferred from the input sprocket 114 to the output gear 116, such that a maximum possible power transfer from the input sprocket 114 to the output gear 116 is accomplished by restricting the rotational rate of the reference carrier.

Having considered an example environment an example transmission, consider now a description of some example details of the transmission and techniques for controlling the transmission in accordance with one or more implementations.

Figure 2:
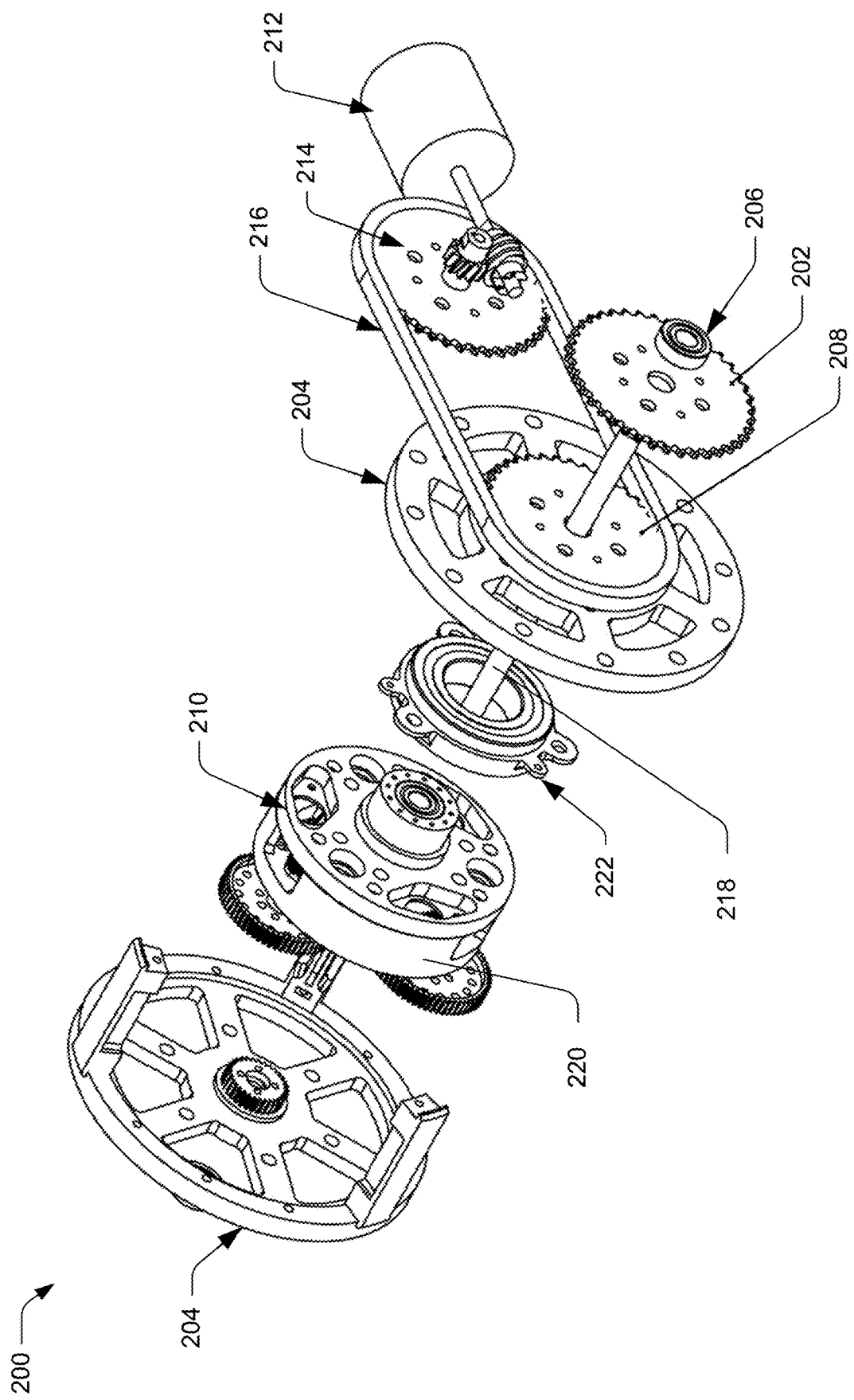
FIG. 2 depicts an example implementation of an exploded view of the transmission of FIG. 1 in greater detail.

FIG. 2 depicts a perspective exploded view 200 of the transmission 106 illustrated in FIG. 1 in accordance with one or more implementations. In the illustrated perspective exploded view 200, the transmission 106 includes a main input sprocket 202. The main input sprocket 202 is representative of an instance of the input sprocket 114 of the transmission 106 as illustrated in FIG. 1. In this manner, the main input sprocket 202 is configured to be rotated via power received from a linkage (not depicted) connecting the drive system 104 to the main input sprocket 202. Power rotating the main input sprocket 202 is transferred through the transmission 106 to cause rotation of an output component 204 of an apparatus implementing the transmission 106, such as the output component 108 illustrated in FIG. 1. The transmission 106 is configured to be coupled to the apparatus 102 via one or more main bearings 206, which are configured to float the transmission 106 on a frame of the apparatus, such that a rotational rate of the output component 204 can vary with respect to a rotational rate of the main input sprocket 202.

In order to control the transmission of power between the main input sprocket 202 and the output component 204 of the apparatus implementing the transmission 106, the transmission 106 includes a reference control sprocket 208. The reference control sprocket 208 is configured to control a rotational rate of the reference carrier 210, the rotational rate of the reference carrier 210 relieves an amount of power transferred from the main input sprocket 202 to the output component 204. In this manner, an increase in the rotational rate of the reference carrier 210 mitigates an amount of power transferred through the transmission 106 from the main input sprocket 202 to the output component 204 (e.g., decreases a rotational rate of the output component 204). Conversely, a decrease in the rotational rate of the reference carrier 210 increases an amount of power transferred through the transmission 106 from the main input sprocket 202 to the output component 204 (e.g., increases a rotational rate of the output component 204).

To control the rotational rate of the reference control sprocket 208, the transmission 106 includes a control system 212, which is representative of an instance of the control system 110 illustrated in FIG. 1. In implementations, the control system 212 may be configured as a servo motor, a stepper motor, a gear motor, combinations thereof, and the like. In the illustrated perspective exploded view 200 of the transmission 106, the control system 212 is configured to govern a rotational rate of the reference control sprocket 208 via a control system sprocket 214 that is linked to the reference control sprocket 208 via control system linkage 216. In implementations, control system linkage 216 may be configured as a belt, a chain, or other suitable form of linkage that transfers rotational movement from the control system sprocket 214 to the reference control sprocket 208.

In the perspective exploded view 200 of an example implementation of the transmission 106, the main input sprocket 202, the output component 204, the main bearing 206, the reference control sprocket 208, and the reference carrier 210 are disposed concentrically on main axle 218. In an example scenario where the transmission 106 is implemented in a vehicle (e.g., a bicycle or motorcycle) and the output component 204 represents a driven wheel of the vehicle, the main axle 218 is representative of an axle for the vehicle. The main axle 218 is attached to the main input sprocket 202, such that rotation of the main input sprocket 202 causes rotation of the main axle 218. In contrast to conventional transmission designs, the main axle 218 is configured as a solid rod that does not include one or more splines, one or more grooves, one or more indentations, one or more protrusions, or one or more sections that are hollow or have a cross-section that otherwise differs from cross-sections of other portions of the main axle. The main axle 218 is further attached to an input sun gear of the reference carrier 210, as described and illustrated in further detail below with respect to FIG. 3. In this manner, the input sun gear of the reference carrier 210 is driven by the main input sprocket 202, such that rotational motion of the main input sprocket 202 causes rotational motion of an interior component of the reference carrier 210.

Although the main axle 218 is attached to a main input sprocket of the reference carrier 210, the reference carrier 210 is configured to rotate about the main axle 218 at a rate that may differ from a rotational rate of the main input sprocket 202. To enable this differentiation, the reference carrier 210 includes a reference carrier frame 220 that carries one or more input/output gear clusters about the input sun gear of the reference carrier 210, as described in further detail below with respect to FIG. 3. The reference carrier frame 220 is configured to be driven by the reference control sprocket 208, such that rotational movement of the reference control sprocket 208 (e.g., via actuation by the control system 212). The reference carrier 210 is configured to float on the main axle 218 while being driven by the reference control sprocket 208 via pass-through bearing 222, which enables the reference control sprocket 208 to access the reference carrier 210.

Figure 3:
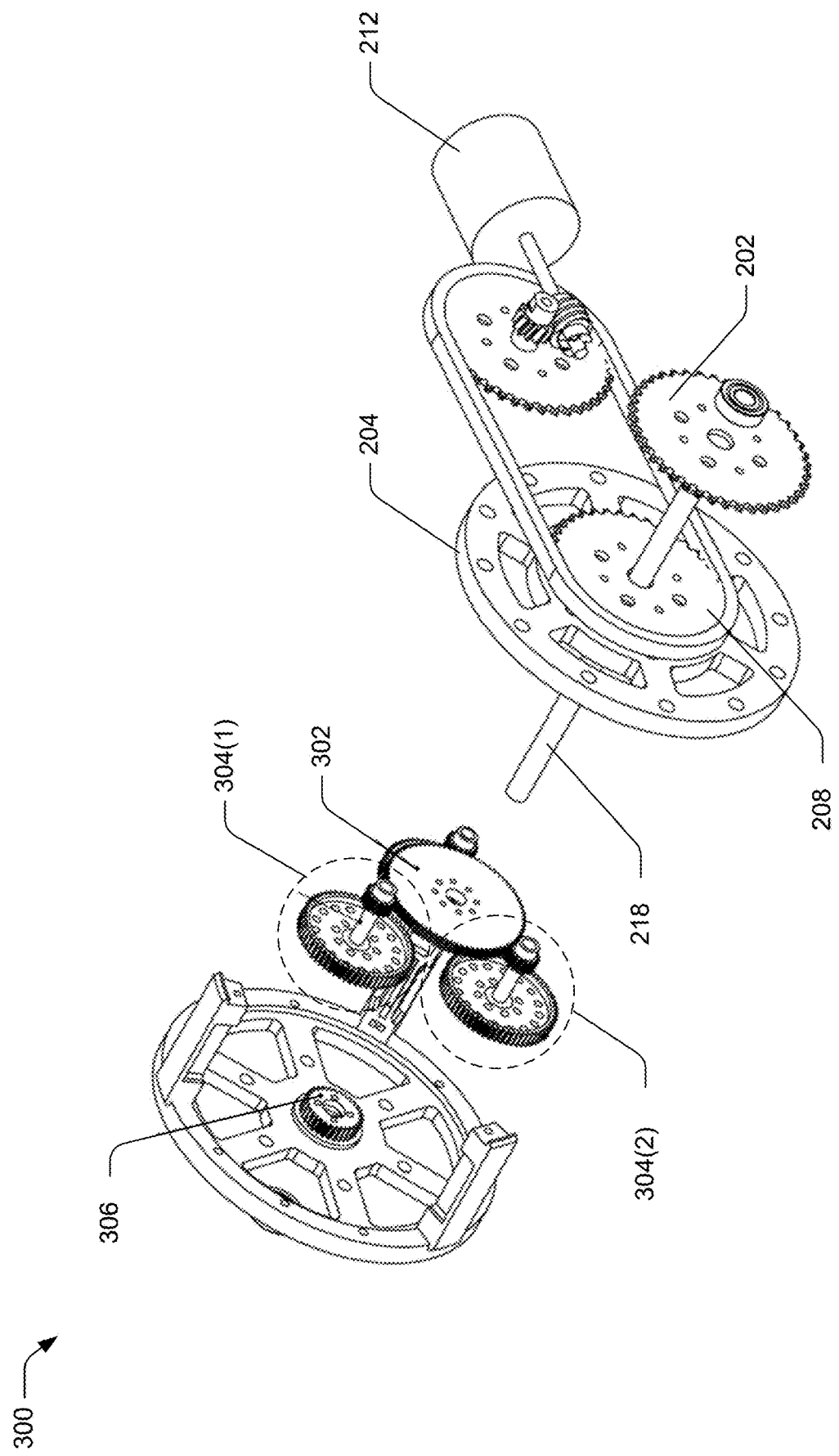
FIG. 3 depicts an example implementation of an exploded view of the transmission of FIG. 1 in greater detail.

FIG. 3 depicts a perspective exploded view 300 of the transmission 106 illustrated in FIG. 1 in further detail, with the reference carrier frame 220 and the pass-through bearing 222 excluded to reveal interior components of the reference carrier 210. In the illustrated perspective exploded view 300, the input sun gear 302 of the reference carrier is attached to the main axle 218 and is thus configured to be actuated via rotation of the main input sprocket 202. The input sun gear 302 is coupled to at least one input/output gear cluster 304, such as the input/output gear clusters 304(1) and 304(2). Each of the input/output gear clusters 304 are configured to be carried by the reference carrier frame 220 about the input sun gear 302, as described in further detail below with respect to FIG. 4. Each of the input/output gear clusters 304 is further meshed with an output gear 306 of the transmission 106, which is coupled to the output component 204 (e.g., a wheel of an apparatus 102 implementing the transmission 106). For a more detailed view illustrating functionality of the input/output gear clusters 304 as part of the reference carrier 210, consider FIG. 4.

Figure 4:
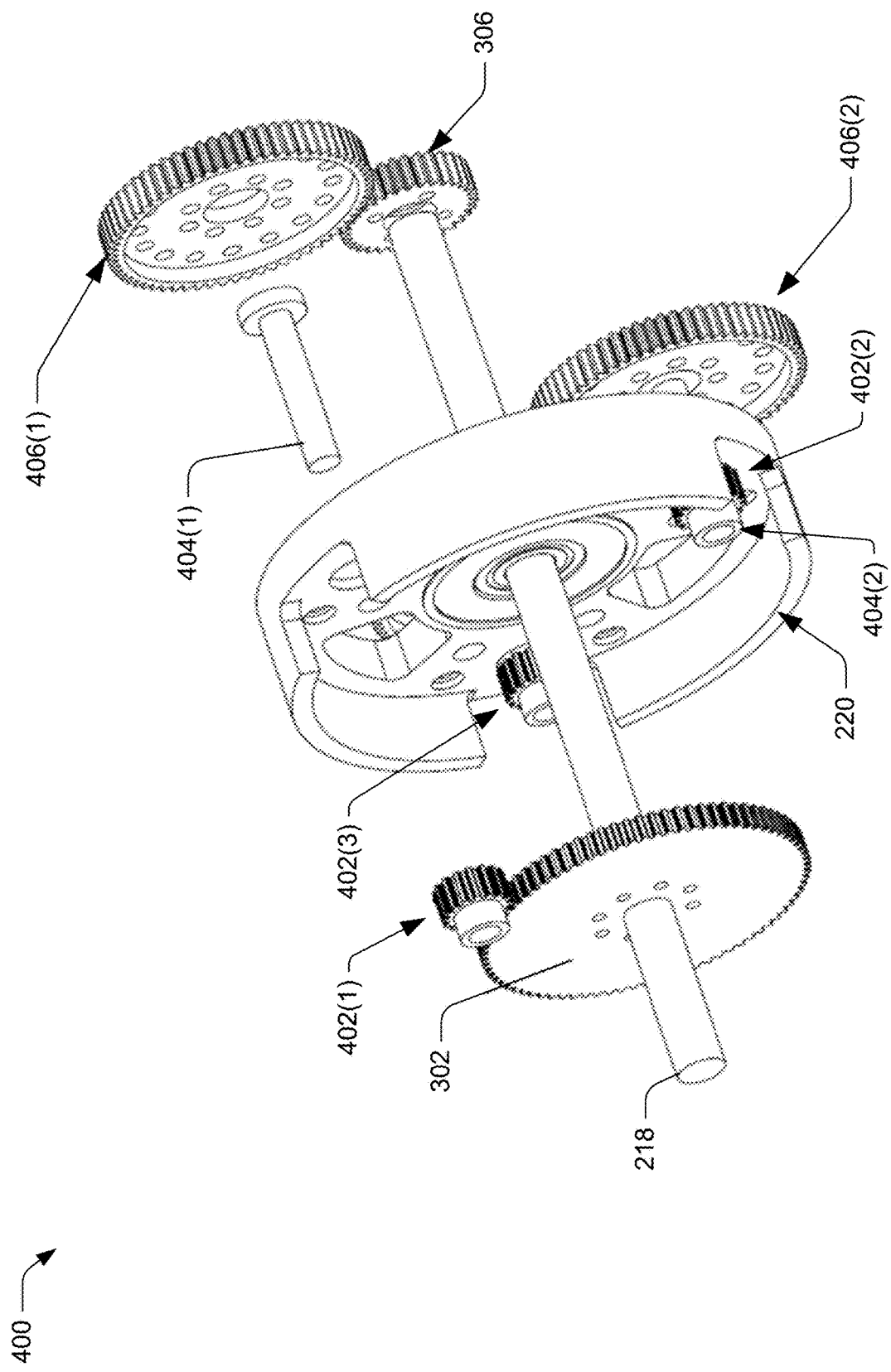
FIG. 4 depicts an example implementation of an exploded view of a reference carrier of the transmission of FIG. 1 in greater detail.

FIG. 4 depicts a perspective exploded view 400 of the reference carrier of the transmission 106 illustrated in further detail. The illustrated perspective exploded view 400 illustrates the input sun gear 302 of the reference carrier 210 as disposed on the main axle 218 of the apparatus implementing the transmission 106, such as apparatus 102 illustrated in FIG. 1. As depicted, the reference carrier frame 220 is also disposed on the main axle 218, concentrically with the input sun gear 302, allowing the main axle 218 to pass through the reference carrier 210 to the output gear 306. The output gear 306 is configured to float on the main axle 218 via one or more bearings (not depicted), such as main bearing 206. In this manner, by floating the output gear 306 on the main axle 218, the output gear 306 is configured to rotate about the main axle 218 at a rate that may differ from a rotational rate of the input sun gear 302 about the main axle 218.

To actuate the output gear 306, the reference carrier 210 leverages at least one of the input/output gear clusters 304 depicted in FIG. 3. Each input/output gear cluster 304 includes an input planet gear 402, a planetary shaft 404, and an output planet gear 406. For instance, the perspective exploded view 400 illustrates the transmission 106 as including three input/output gear clusters 304, where the input planet gears 402(1), 402(2), and 402(3) are meshed to the input sun gear 302 of the reference carrier 210. By meshing the input planet gears 402 with the input sun gear 302, actuation of the input sun gear 302 (e.g., by the main input sprocket 202) causes rotation of the input planet gears 402. Each input planet gear 402 is fixed to a corresponding planetary shaft 404, which passes through the reference carrier frame 220 to attach with a counterpart output planet gear 406.

For instance, in accordance with one or more implementations, input planet gear 402(1) and output planet gear 406(1) are each fixed to planetary shaft 404(1). In a similar manner, input planet gear 402(2) and output planet gear 406(2) are each fixed to planetary shaft 404(2). Each output planet gear 406 is meshed with output gear 306, such that rotational motion of the input sun gear 302 causes rotational motion of the one or more input planet gears 402, which in turn causes rotational motion of the one or more output planet gears 406, which consequently causes rotational motion of the output gear 306. Because the output gear 306 is affixed to an output component 204 of the apparatus implementing the transmission 106, rotational motion of the output gear 306 is transferred to actuate the output component 204. In this manner, a change to a rotational rate of the input sun gear 302 of the reference carrier 210 causes a change in a rotational rate of the output gear 306 in an example scenario where a rotational rate of the reference carrier 210 remains constant. Advantageously, the transmission 106 is configured to alter a rotational rate of the output gear 306 independent of a change to a rotational rate of the input sun gear 302 (e.g., when the rotational rate of the input sun gear 302 remains constant).

Specifically, increasing a rotational rate of the reference carrier 210 in a same direction as a rotation of the input sun gear 302 about the main axle 218 reduces a rotational rate of the output gear 306. Conversely, decreasing a rotational rate of the reference carrier 210 in the same direction as the rotation of the input sun gear 302 about the main axle increases the rotational rate of the output gear 306.

In a similar manner, increasing a rotational rate of the reference carrier 210 in an opposite direction about the main axle 218 as the rotation of the input sun gear 302 about the main axle 218 increases the rotational rate of the output gear 306, thus providing an overdrive scenario for the apparatus implementing the transmission 106. Decreasing the rotational rate of the reference carrier 210 about the main axle in the direction opposite the rotation of the input sun gear 302 about the main axle decreases the rotational rate of the output gear 306.

Thus, the reference carrier 210 of the transmission 106 enables altering an amount of power transferred from the drive system 104 to the output component 108 of the apparatus implementing the transmission 106, even when an output of the drive system 104 remains constant. As noted above, the rotational rate of the reference carrier 210 is controlled via the control system 212, and example implementations of controlling the rotational rate of the reference carrier 210 are described in further detail below with respect to FIG. 14.

As another advantage that distinguishes the transmission 106 from conventional transmission designs, the components of the transmission 106 do not change arrangement relative to one another during operation of the transmission 106. For instance, at any point during operation of the transmission 106, a distance between a centroid of the input sun gear 302 and a centroid of the input planet gear 402 remains constant. Likewise, there is no change in a distance between a centroid of the output planet gear 406 and a centroid of the output gear 306, despite the input planet gears 402 orbiting the input sun gear 302 and the output planet gears 406 orbiting the output gear 306. In a similar manner, a distance between the input sun gear 302 and the output gear 306 remains constant during operation of the transmission 106.

Having considered example exploded views of the transmission 106, consider now additional detail views of the transmission 106.

Figure 5:
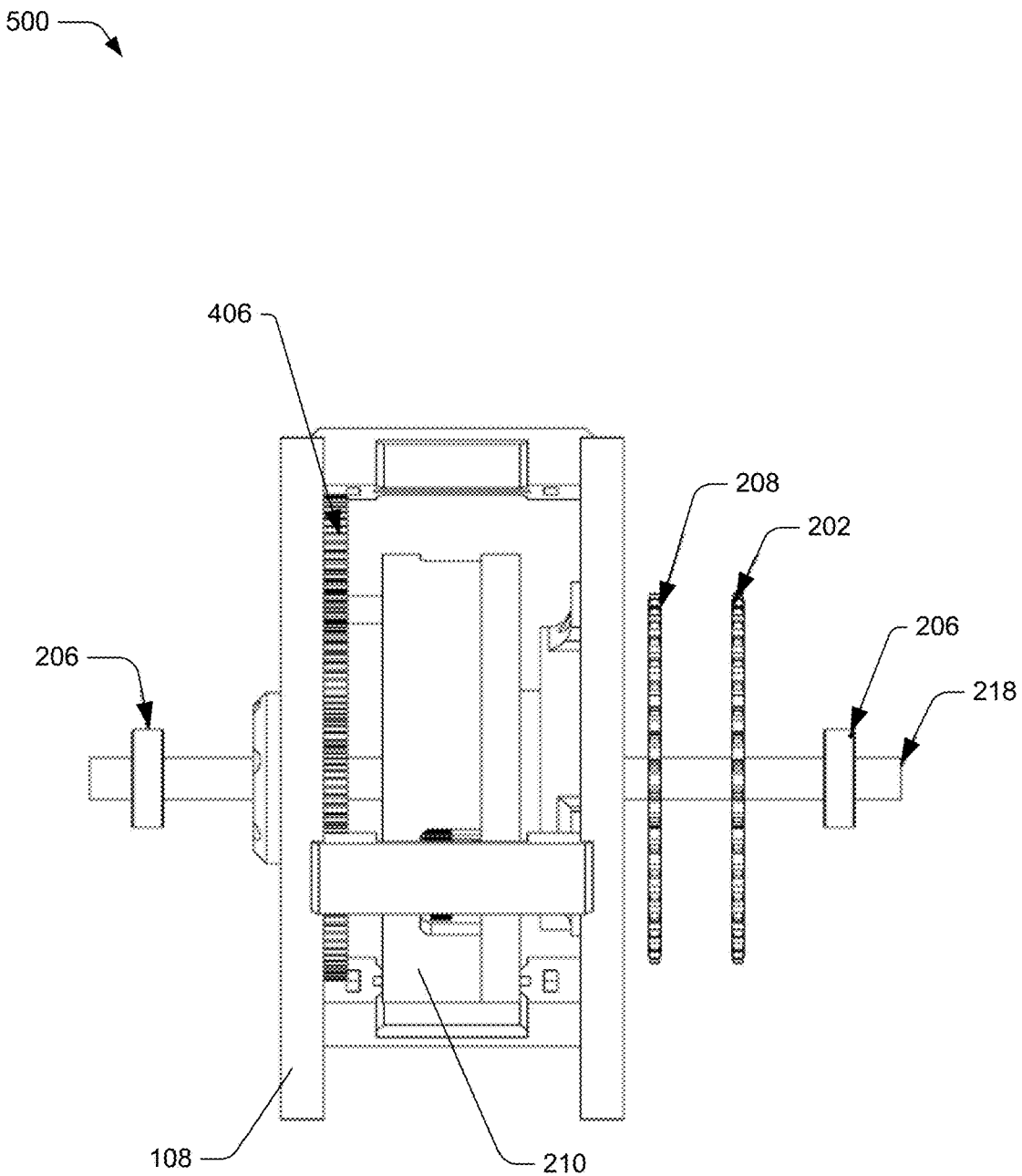
FIG. 5 depicts an example implementation of an apparatus including the transmission of FIG. 1.

FIG. 5 depicts an example implementation 500 of an apparatus including the transmission 106 of FIG. 1 in further detail, with the transmission 106 disposed within a frame of an output component 108 of the apparatus. For instance, the implementation 500 depicts an example scenario where the output component 108 is configured as a wheel, such as in a scenario where the apparatus 102 is configured as a vehicle (e.g., a bicycle, a motorcycle, a car, and so forth). In contrast to the exploded perspective views of FIGS. 2-4, FIG. 5 illustrates a side view of the transmission 106 as disposed on a main axle 218 of the apparatus 206. The transmission 106 is configured to float on a frame of the apparatus 102 via main bearings 206. The transmission 106 is configured to receive power from a drive system 104 of the apparatus via actuation of the main input sprocket 202.

As the drive system 104 causes rotation of the main input sprocket 202, the drive system 104 also causes rotation of the reference carrier 210, due to the coupling of both the main input sprocket 202 and the input sun gear 302 (not depicted) of the reference carrier 210 to the main axle 218. Rotation of the input sun gear 302 transfers through one or more input/output gear clusters 304 to actuate a corresponding one or more output planet gears 406. As described and illustrated with respect to FIG. 4, each of the one or more output planet gears 406 are meshed with an output gear 306 of the transmission 106, such that actuation of the main input sprocket 202 causes actuation of the reference carrier 210, which causes actuation of the output component 108 via coupling of the output component 108 to the output gear 306. To relieve an amount of power transferred from the main input sprocket 202 to the output component 108, the reference carrier 210 is configured to be actuated via the reference control sprocket 208, such that a change in a rotational rate of the reference carrier 210 alters a rotational rate of the output component 108 when a rotational rate of the main input sprocket 202 remains constant.

Figure 6:
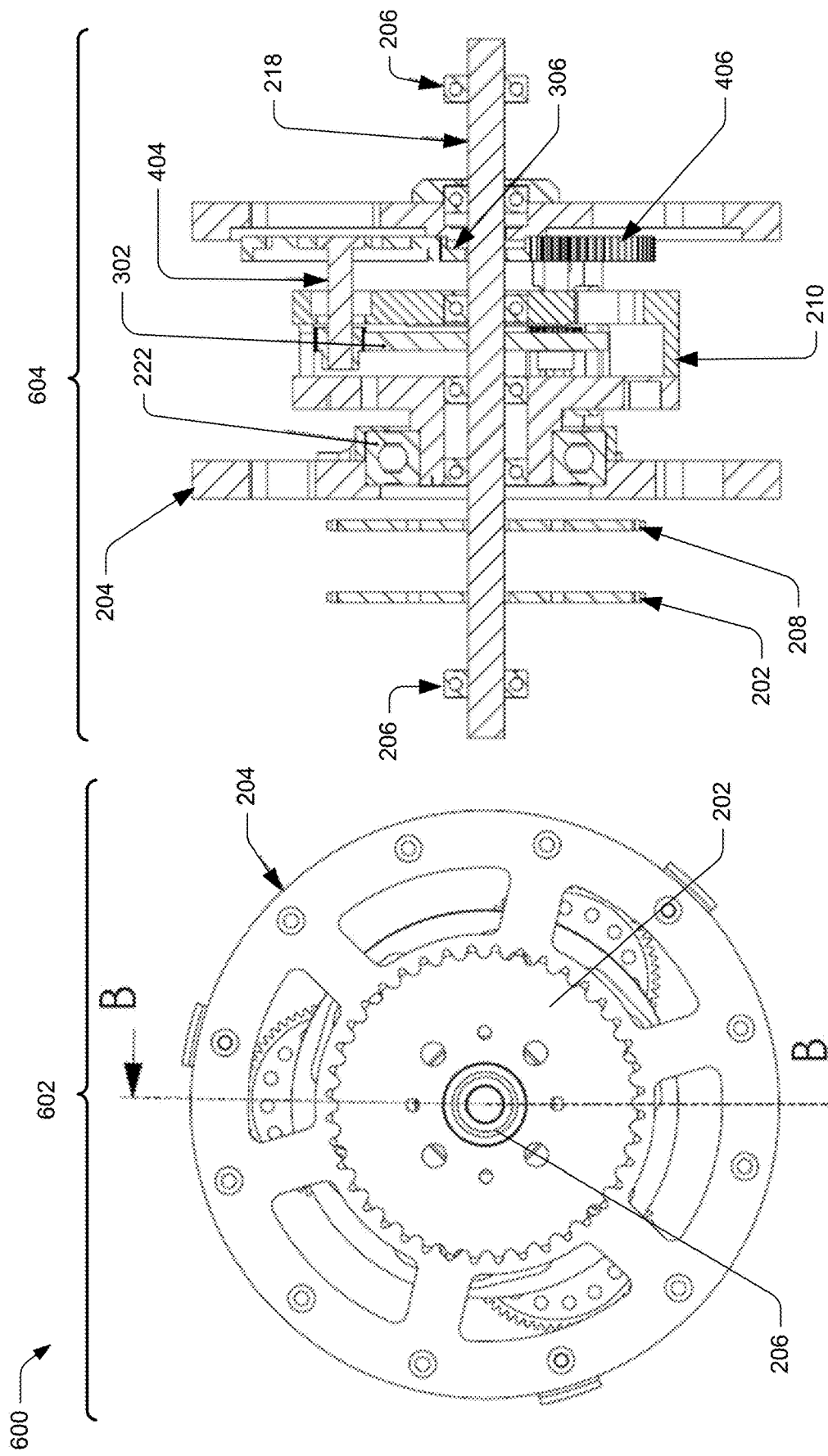
FIG. 6 depicts an example of the transmission of FIG. 1 as incorporated into an apparatus in accordance with one or more implementations.

FIG. 6 depicts an example implementation 600 of the transmission 106 of FIG. 1 in further detail, as incorporated by an apparatus. Specifically, the example implementation 600 depicts a front view 602 of the example implementation 500 as well as a cross-section view 604, which depicts a section B-B view of the front view 602. The cross-section view 604 illustrates how the configuration of the transmission 106 advantageously requires a smaller footprint than conventional continuous variable transmissions, such that a majority or an entirety of the transmission 106 can be disposed within a housing of the output component 204. Upon receiving power from the drive system 104, the main input sprocket 202 is actuated, which causes rotation of the main axle 218 independent of rotation of the apparatus frame by virtue of the transmission 106 floating on the apparatus 102 via one or more main bearings 206.

In the example implementation 600, an entirety of the transmission 106 is disposed within a housing of the output component of the apparatus implementing the transmission 106, other than the input sprocket 202 and the reference control sprocket 208. Such a configuration of the transmission 106 may be implemented when the control system 110 is implemented externally from a housing of the output component 204 being driven by the transmission 106, such as in an implementation where the control system 110 is configured as an electronically positionable motor, a worm gear, combinations thereof, and so forth.

As described above with respect to FIGS. 2-5, actuation of the reference control sprocket 208 (e.g., by the control system 110) is translated to actuation of the reference control 210 through the pass-through bearing 222. Because actuation of the main input sprocket 202 initially causes actuation of the reference carrier 210 by way of coupling to the input sun gear 302 of the reference carrier 210, actuation of the reference control sprocket 208 governs a degree of relief of motion of the reference carrier 210 as caused by the main input sprocket 202. As such, an overall output (e.g., gear ratio) of the transmission 106 is dependent on movement of the reference control sprocket 208. For instance, in an example implementation where the main input sprocket 202 and the reference carrier 210 are rotating about the main axle 218 in a common direction at approximately the same rotational rate without restricting rotation of the reference carrier 210, the resulting output of the transmission 106 comprises a maximum torque of the transmission 106. Stated differently, a maximum torque of the transmission 106 is represented by a lowest number of revolutions of the output gear 306 per single revolution of the main input sprocket 202.

Upon actuation of the reference control sprocket 208, rotation of the reference carrier 210 relative to rotation of the main input sprocket 202 is slowed, which results in less forward relief of the one or more input/output clusters 304 and increases an output ratio of the transmission 106 in a continuous (e.g., non-stepwise manner). The continuous increase in the output ratio of the transmission 106 continues as rotation of the reference carrier 210 is further restricted, until a point where movement of the reference carrier 210 is fully restricted. Upon full restriction of the reference carrier 210 by the control system 110, a highest gear ratio/lowest torque of the transmission 106 is achieved (e.g., maximum revolutions of the output component 204 relative to a single revolution of the main input sprocket).

In this manner, the transmission 106 is configured to smoothly and continuously transition from a maximum revolutions-per-minute (RPM) and lowest torque gear ratio to a highest torque and minimum RPM gear ratio without disengaging the drive system 104 from the output component 204. Further, during operation of the transmission 106, components of the transmission 106 advantageously do not change arrangement relative to one another, resulting in increased reliability, and reduced fatigue, of the transmission 106 relative to conventional transmissions while requiring less space than that otherwise occupied by conventional transmission designs.

Having considered example implementations of transmissions, consider now some example implementations of the transmission 106 of FIG. 1 where the control system 110 is configured as a mechanical feedback control.

Mechanical Feedback Control System

Figure 7:
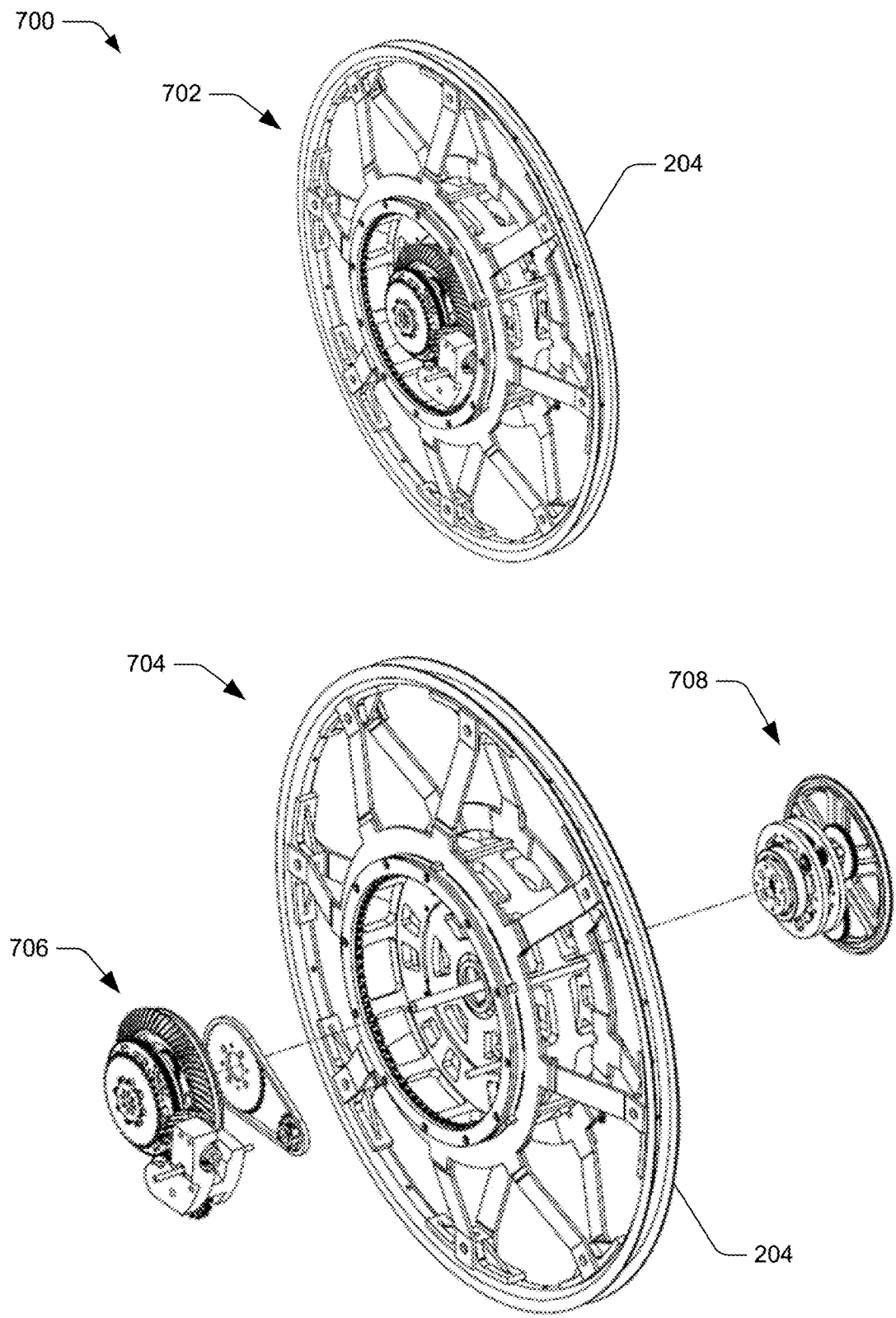
FIG. 7 depicts an example of the transmission of FIG. 1 as incorporated into an apparatus in accordance with one or more implementations.

FIG. 7 depicts an example implementation 700 of the transmission 106 of FIG. 1 as incorporated within a housing of an output component of an apparatus implementing the transmission 106. In the example implementation 700, view 702 depicts a perspective view of an example implementation where the transmission 106 is incorporated within a housing of an output component 204 of the apparatus implementing the transmission 106, where the output component 204 is configured as a wheel. View 704 depicts an exploded perspective view of view 702. In view 704, transmission 106 is illustrated as including two portions that are each configured to be disposed within a housing of the output component 204: a mechanical feedback control system 706 and a primary transmission assembly 708. The primary transmission assembly 708 is representative of components of the transmission 106 introduced above with respect to FIGS. 2-4, specifically a reference carrier 210 (configured to rotate about main axle 218 at a rate controlled by a reference control sprocket 208, an input sun gear 302), one or more input/output gear clusters 304, and an output gear 306. For a more detailed description of the mechanical feedback control system 706, consider FIG. 8.

Figure 8:
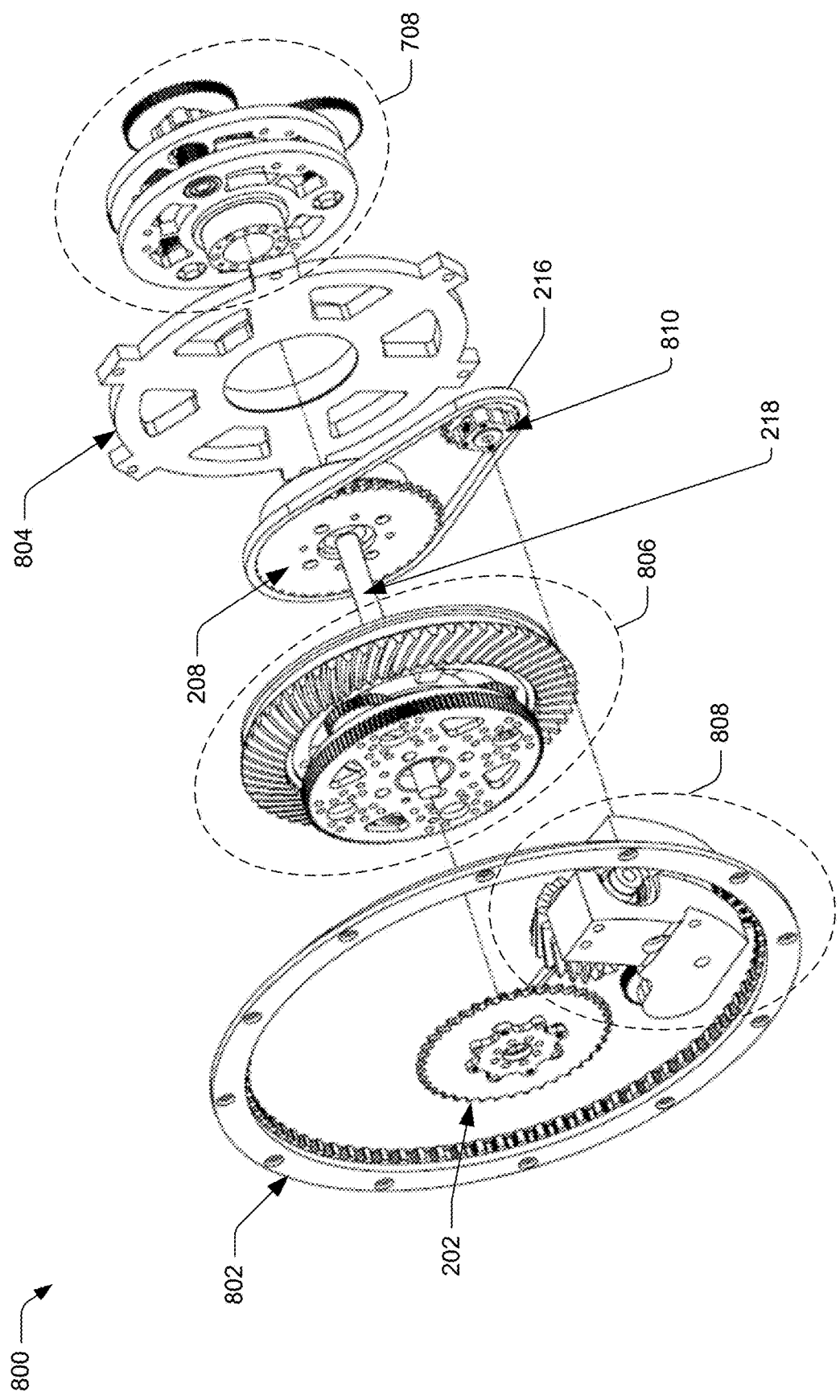
FIG. 8 depicts an example implementation of an exploded view of the transmission of FIG. 1 in greater detail.

FIG. 8 depicts an example implementation 800 of an exploded view of the transmission 106 of FIG. 1 that illustrates the mechanical feedback control system 706 of FIG. 7 in greater detail. In the example implementation 800, the mechanical feedback control system 706 of the transmission 106 includes an output feedback gear 802. The output feedback gear 802 is representative of functionality of the transmission 106 to mechanically determine a current rotational rate of the output component 204 (e.g., a current RPM of the wheel configuration of the output component 204 as depicted in FIG. 7). In accordance with one or more implementations, the output feedback gear 802 is attached to an interior of a frame of the output component 204, such that a rotational rate of the output feedback gear 802 is the same as a rotational rate of the output component 204. In some implementations, the output component 204 may include a portion of its frame disposed between the mechanical feedback control system 706 and the primary transmission assembly 708, as represented by the output component frame 804 (e.g., a center support for the wheel configuration of the output component 204 as depicted in FIG. 7). Alternatively, in some implementations the output component frame 804 may not be disposed between the mechanical feedback control system 706 and the primary transmission assembly 708.

In addition to the output feedback gear 802, the mechanical feedback control system 706 includes a central feedback drive assembly 806, which is configured to translate feedback from the output component 204 to the reference carrier 210 of the transmission 106, as illustrated and described in further detail below with respect to FIG. 9. To transfer mechanical feedback from the output feedback gear 802 to the central feedback drive assembly 806, the transmission 106 includes worm drive assembly 808, the operation of which is illustrated and described in further detail below with respect to FIG. 10. The worm drive assembly is connected to worm drive sprocket 810, such that the output feedback gear 802, the central feedback drive assembly 806, the worm drive assembly 808, and the worm drive sprocket 810 collectively represent an example configuration of the control system 212 in accordance with one or more implementations. The worm drive sprocket 810 is linked to reference control sprocket 208 via control system linkage 216. In this manner, mechanical feedback describing a rotational rate of the output component 204 causes actuation of the reference carrier 210, as described in further detail below with respect to FIGS. 9-11. Like the reference control sprocket 2087, the central feedback drive assembly 806 is configured to float on main axle 218, such that an output of the central feedback drive assembly 806 depends on a rotational rate of the output feedback gear 802, rather than a rotational rate of the main input sprocket 202.

Figure 9:
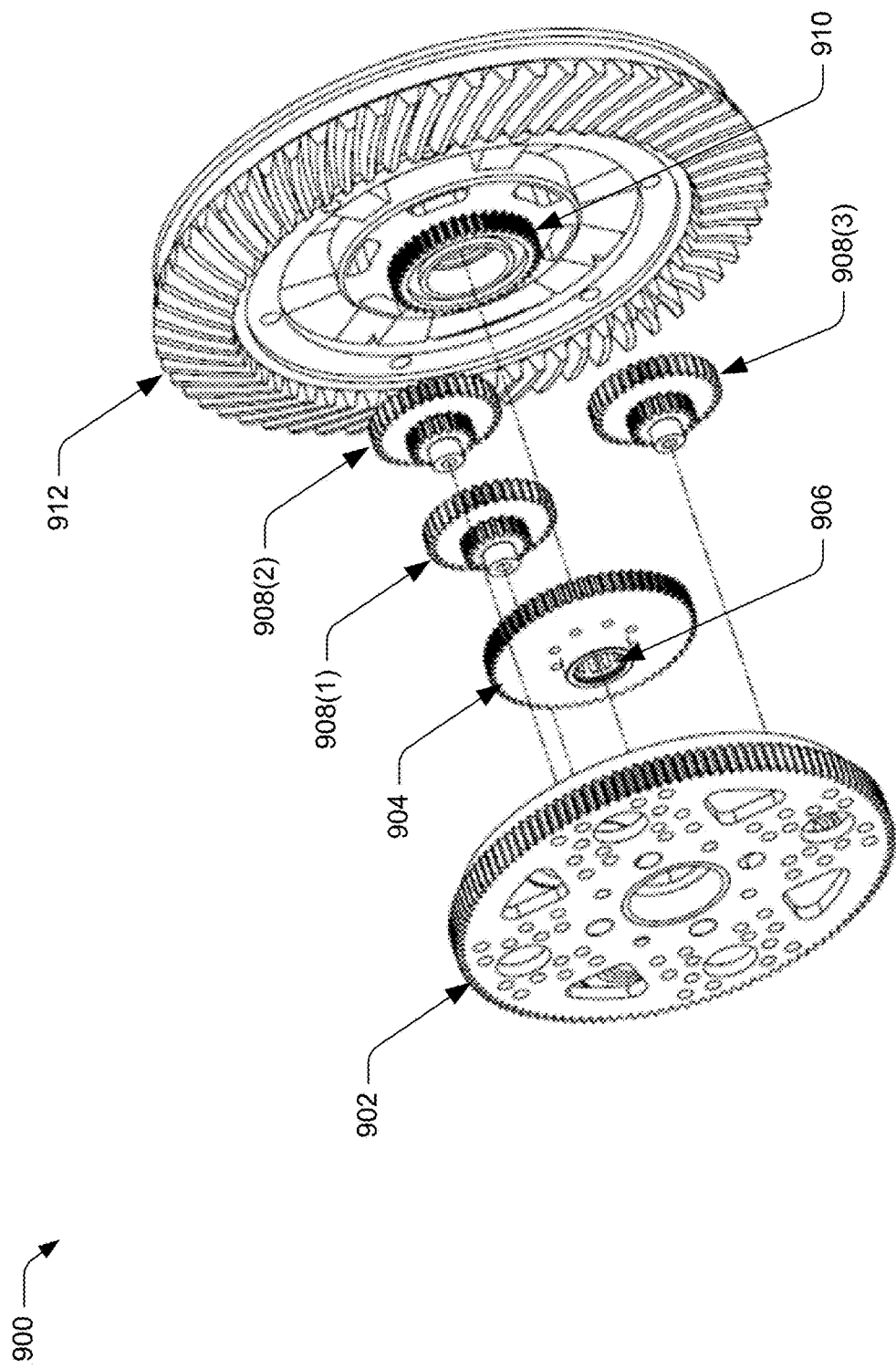
FIG. 9 depicts an example of a feedback drive assembly of the transmission of FIG. 1 in accordance with one or more implementations.

FIG. 9 depicts an exploded perspective view 900 of a central feedback drive assembly 806 of the transmission 106 in greater detail in accordance with one or more implementations. In the exploded perspective view 900, the central feedback drive assembly 806 includes a mechanical feedback input gear and carrier 902. The mechanical feedback input gear and carrier 902 is configured to receive feedback from the output component 204 by way of the worm drive assembly 808, as illustrated and described in further detail below with respect to FIG. 10. The central feedback drive assembly 806 further includes a mechanical feedback drive gear 904, which is connected to the main axle 218 (not depicted) via a one-way clutch 906, which ensures that actuation of the main input sprocket 202 can cause actuation of the mechanical feedback drive gear 904 while preventing actuation of the mechanical feedback drive gear 904 from causing actuation of the main input sprocket 202.

In addition to receiving feedback from the output component 204, the mechanical feedback input gear and carrier 902 is configured to serve as a carrier for one or more mechanical feedback planet gears 908, such as mechanical feedback planet gears 908(1), 908(2), and 908(3). In this manner, the mechanical feedback planet gears 908 are configured to orbit both the mechanical feedback drive gear 904 as well as a mechanical feedback output gear 910, while being carried by the mechanical feedback input gear and carrier 902. The mechanical feedback output gear 910 is thus driven by the mechanical feedback planet gears 908 and coupled to the bevel ring gear 912, such that a rotational motion of the bevel ring gear 912 is driven by rotational motion of the mechanical feedback output gear 910.

By virtue of this configuration of components of the central feedback drive assembly 806 as illustrated in the exploded perspective view 900, the central feedback drive assembly 806 is configured to ascertain a rotational velocity of the output component of the apparatus 102 implementing the transmission 106 independent of any computing device or other electronic component. By excluding electronic components from the transmission 106, the example mechanical feedback configuration of the control system 212 in the illustrated example of FIG. 9 translates the rotational motion of the output component 204 directly to forward relief of the reference carrier 210. For instance, during operation of the apparatus implementing the transmission 106, forward relief (e.g., a rate of rotation of) the reference carrier 210 depends on a rotational rate of the output component 204, which is translated directly to the mechanical feedback input gear and carrier 902.

When the mechanical feedback input gear and carrier 902 is motionless, the central feedback drive assembly 806 causes a maximum rotational rate of the bevel ring gear 912, which increases a rotational rate of the reference carrier 210. Conversely, as a rotational rate of the mechanical feedback input gear and carrier 902 increases, a rotational rate of the bevel ring gear 912 is reduced, consequently reducing a rotational rate of the reference carrier 210. For a better understanding of how mechanical feedback is translated from the output component through the central feedback drive assembly 806 to the reference carrier 210, consider FIG. 10.

FIG. 10 depicts an example implementation 1000 of the central feedback drive assembly 806 for the transmission 106 in greater detail. The illustrated example of FIG. 10 depicts a front view 1002 of the central feedback drive assembly 806, a perspective view of a feedback gear cluster 1004 of the central feedback drive assembly 806, and a perspective view of a bevel pinion gear and worm gear set 1006 of the central feedback drive assembly 806 in accordance with one or more implementations. As depicted in the front view 1002, the central feedback drive assembly 806 includes the mechanical feedback input gear and carrier 902 and the output feedback gear 802 disposed concentrically about the main axle 218 of the apparatus implementing the transmission 106. The central feedback drive assembly 806 includes one or more brackets 1008 that are configured to hold the feedback gear cluster 1004 and the bevel pinion gear and worm gear set 1006 of the central feedback drive assembly 806.

The feedback gear cluster 1004 is representative of functionality of the central feedback drive assembly 806 to transfer motion of the output component 204 of the apparatus implementing the transmission 106 to the mechanical feedback input gear and carrier 902. To do so, the feedback gear cluster 1004 includes an output gear 1010 that is meshed with the mechanical feedback input gear and carrier 902. The output gear 1010 is further meshed with an input gear 1012. The input gear 1012 is meshed with the output feedback gear 802 coupled to the output component 204, such that rotational motion of the output component 204 is translated to the mechanical feedback input gear and carrier 902 by way of the output feedback gear 802, the input gear 1012, and the output gear 1010.

As described above and illustrated with respect to FIG. 9, rotational motion of the mechanical feedback input gear and carrier 902 is translated to rotational motion of the bevel ring gear 912. The bevel ring gear 912 is configured to be meshed with a bevel pinion gear 1014 of the bevel pinion gear and worm gear set 1006, such that rotation of the bevel gear 912 about a first axis causes rotation of the bevel pinion gear 1014 about a second axis that is generally perpendicular to the first axis. The bevel pinion gear 1014 is configured to include a worm screw 1016 extending along the second axis and is configured to mesh with a worm wheel 1018. The worm wheel 1018 is coupled to the worm drive sprocket 810, as introduced in FIG. 8, such that rotational motion of the bevel ring gear 912 is translated to the worm drive sprocket 810 via the bevel pinion gear 1014, the worm screw 1016, and the worm wheel 1018 of the central feedback drive assembly 806 of the transmission 106. In this manner, the central feedback drive assembly 806 is representative of a fully mechanical (e.g., without electronic components) configuration of the control system 110 that is configured to be disposed fully within a housing of an output component 108 of the apparatus 102 implementing the transmission 106.

Figure 11:
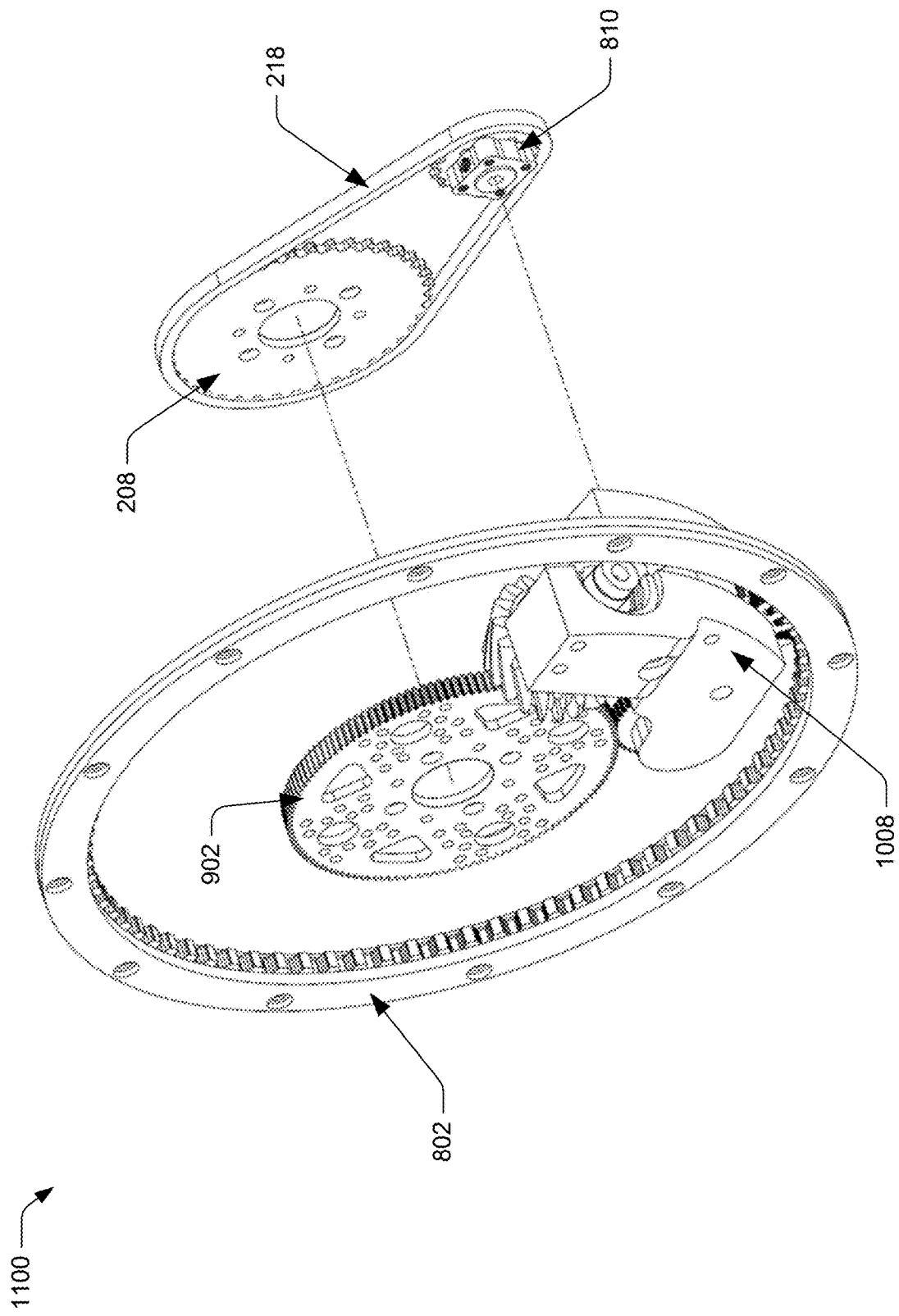
FIG. 11 depicts an example implementation of an exploded view of the transmission of FIG. 1 in greater detail.

FIG. 11 depicts a perspective exploded view 1100 of the central feedback drive assembly 806 for the transmission 106 of FIG. 1 in greater detail in accordance with one or more implementations. As illustrated in the perspective exploded view 1100, the rotational motion of the output component 204 (not depicted) is translated to the mechanical feedback input gear and carrier 902 by way of the output feedback gear 802, via the feedback gear cluster 1004 of the central feedback drive assembly 806, as supported by the one or more brackets 1008. Rotational motion of the mechanical feedback input gear and carrier 902, together with rotational motion of the mechanical feedback drive gear 904 (not depicted) as driven by the drive system 104 of the apparatus, influences a rotational rate of the bevel ring gear 912. Rotational motion of the bevel ring gear 912 is then translated though the bevel pinion and worm gear set 1006, as supported by the one or more brackets 1008, to the worm drive sprocket 810.

The worm drive sprocket 810 is linked to the reference control sprocket 208 via the control system linkage 218, which directly controls a rotational rate of the reference carrier 210 for the transmission 106. Consequently, the central feedback drive assembly 806 represents an instance of the control system 110 that is configured to automatically control a rotational rate of the reference carrier 210 for the transmission 106 based on a mechanically determined rotational rate of an output component 204 of the apparatus 102 implementing the transmission 106, as well as a mechanically determined amount of power being output by the drive system 104 of the apparatus 102.

Having considered example implementations of transmissions configured with mechanical feedback-based controls, consider now some example implementations of the transmission 106 of FIG. 1 where the control system 110 is configured as a hybrid control.

Hybrid Control System

Figure 12:
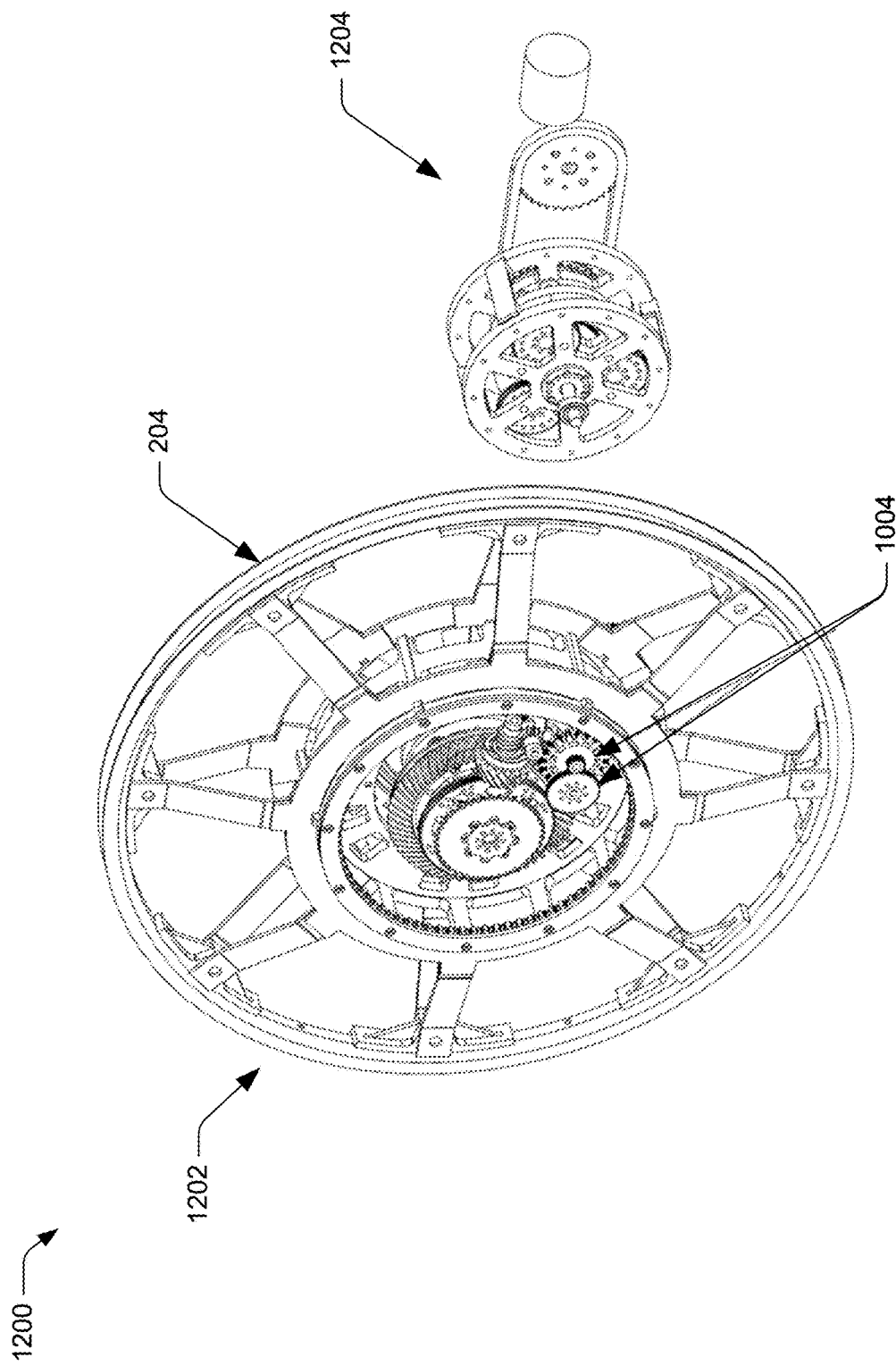
FIG. 12 depicts an example implementation of a hybrid mechanical feedback and computing device control system for the transmission of FIG. 1 in accordance with one or more implementations.

FIG. 12 depicts an example implementation 1200 of the transmission 106 of FIG. 1 as partially incorporated within a housing of an output component of an apparatus implementing the transmission 106. In the example implementation, first portion 1202 is depicted as a perspective view of an example implementation as a portion of the transmission 106 configured to be incorporated within a housing of an output component 204 of the apparatus implementing the transmission 106. Similar to the example implementation 700 described above and depicted in FIG. 7, the output component 204 in the example implementation 1200 is configured as a wheel. In contrast to the purely mechanical feedback-controlled configuration of the transmission 106 illustrated and described above with respect to FIGS. 7-11, the first portion 1202 does not include the feedback gear cluster 1004. Specifically, although depicted in the example implementation 1200 to demonstrate inclusion of components that are similar to the mechanical feedback control system 706 and the primary transmission assembly 708 as described above and illustrated with respect to FIGS. 7-9, the first portion 1202 excludes the output gear 1010 and the input gear 1012 of the feedback gear cluster 1004.

In contrast to the mechanical feedback control system 706, the example implementation 1200 replaces the feedback gear cluster 1004 included in the mechanical feedback control system 706 with the second portion 1204. Second portion 1204 is depicted as a perspective view of an example implementation as a portion of the transmission 106 configured to be incorporated external from the housing of the output component 204 of the apparatus implementing the transmission 106. In the illustrated example, the second portion 1204 includes the components of the exploded view 200 of the transmission 106, as described above with respect to FIG. 2. In this manner, the second portion 1204 is representative of an additional instance of the transmission 106, as described above with respect to FIGS. 2-6. By configuring the control system 110 in the manner illustrated by portion 1204, the control system 110 is configured to adjust a rotational rate of the reference carrier 112 based on mechanical feedback describing a rotational rate of the output component 108 independent of any computational processing and, alternatively or additionally, feedback received from one or more computing devices. For a more detailed description of how the first portion 1202 and the second portion 1204 enable the control system 110 to control output of the transmission 106 based on one or more of computing device or mechanical feedback, consider FIG. 13.

Figure 13:
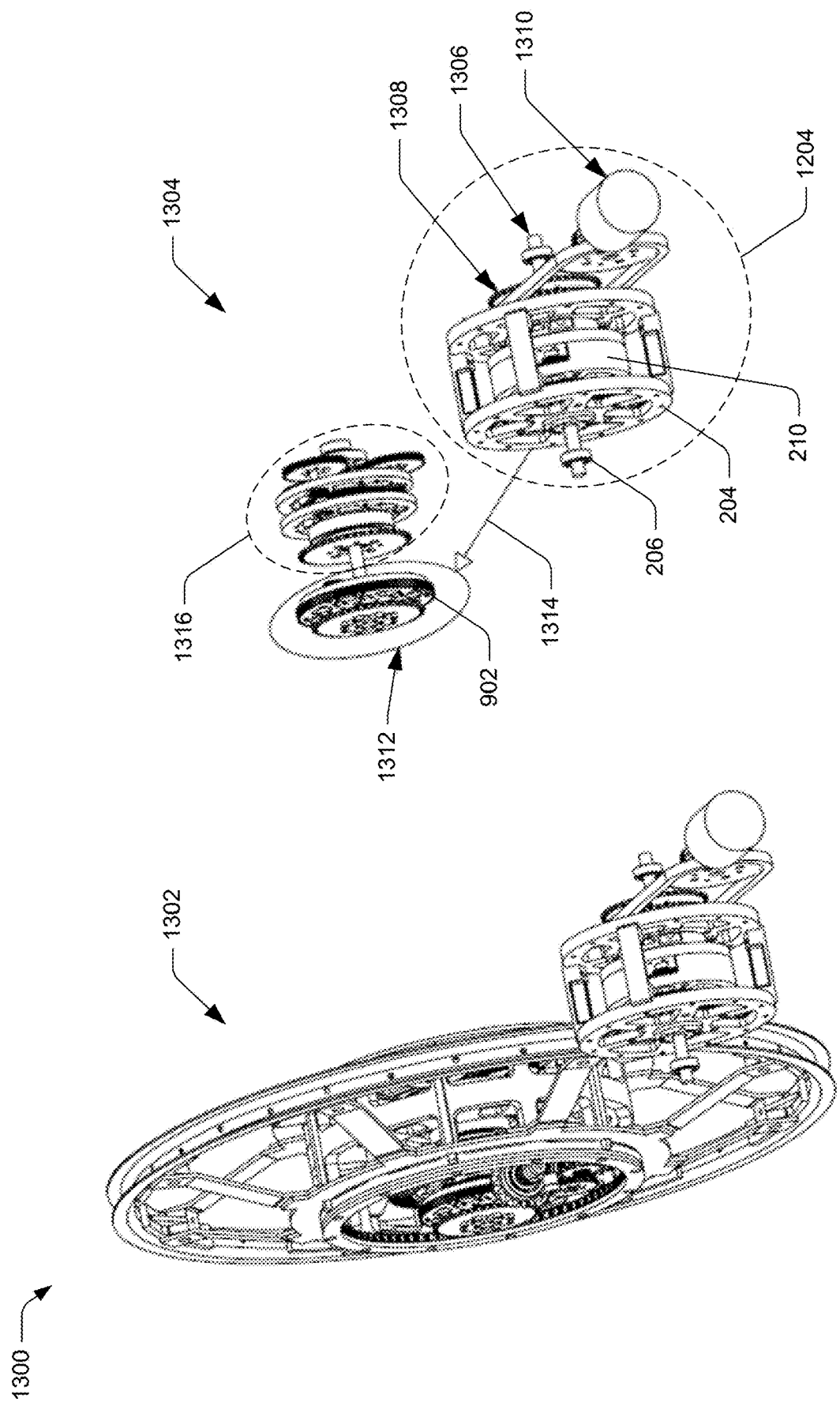
FIG. 13 depicts an example implementation of a hybrid mechanical feedback and computing device control system for the transmission of FIG. 1 in greater detail in accordance with one or more implementations.

FIG. 13 depicts an example implementation 1300 of the transmission 106 of FIG. 1 that illustrates the first portion 1202 and the second portion 1204 in an example implementation where the transmission 106 is configured to be controlled based on mechanical feedback describing a rotational rate of the output component 108 independent of any computational processing and, alternatively or additionally, feedback received from one or more computing devices. In the example implementation 1300, view 1302 depicts an isometric representation of the example implementation 1200. For additional detail of components included in the transmission 106 when configured according to the example implementations illustrated in FIGS. 12 and 13, view 1304 depicts view 1302, excluding the output component 204 of the apparatus 102 implementing the transmission 106 (e.g., excluding the wheel depicted in example implementation 1200 and view 1302).

As illustrated in view 1304, the second portion 1204 is representative of functionality of the transmission 106 to override a purely mechanical feedback-based approach of controlling output of the transmission 106. To do so, the second portion 1204 includes components of the transmission 106 similar to described above and illustrated with respect to FIGS. 2-6. However, while the second portion 1204 includes components similar to those described above and illustrated with reference to FIGS. 2-6, certain components of the second portion 1204 are re-named relative to their corresponding description with respect to FIGS. 2-6 to provide clarity regarding how the components operate with respect to the example implementations depicted in FIGS. 12 and 13.

As introduced with respect to FIG. 2, the second portion 1204 includes one or more main bearings 206, which are configured to float the second portion 1204 on a frame of an apparatus implementing the transmission 106. The second portion 1204 is configured to be disposed on a secondary axle 1306, which may be configured in a similar manner as the main axle 218 described above and introduced with respect to FIG. 2. In contrast to FIG. 2, the second portion 1204 replaces the main input sprocket 202 with a mechanical coupling input sprocket 1308. The mechanical coupling input sprocket 1308 is configured to be linked (not depicted) to the output feedback gear 802, such that rotational movement of the output feedback gear 802 drives rotational movement of the mechanical coupling input sprocket 1308. The mechanical coupling input sprocket 1308 is fixed to the secondary axle 1306, such that rotational movement of the output feedback gear 802 drives rotational movement of the secondary axle 1306.

Similar to the configuration illustrated in FIG. 2, the second portion 1204 includes a reference control sprocket 208 (not depicted via a callout in FIG. 13) that is configured to control a rotational rate of the reference carrier 210 of the second portion 1204. A rotational rate of the reference control sprocket in the second portion 1204 is configured to be controlled by the mechanical override drive system 1310. In this manner, the mechanical override drive system 1310 is representative of functionality similar to that provided by the control system 212 described above and illustrated with respect to FIG. 2. The rate at which the reference carrier 210 of the second portion 1204 rotates about the secondary axle 1306 controls a rate at which the output component 204 of the second portion 1204 rotates, independent of a change to a rotational rate of the mechanical coupling input sprocket 1308 (e.g., independent of a change in a rotational rate of a wheel of the apparatus implementing the transmission 106 to which the mechanical coupling input sprocket 1308 is linked).

Although illustrated as a wheel frame in the example implementation 1300 to visually indicate similarity to the output component 204 depicted in FIG. 2, the output component 204 of the second portion 1204 is configured to link to a mechanical feedback control assembly 1312 of the transmission 106 via a linkage indicated by arrow 1314. In this manner, the output component 204 of the second portion 1204 may be configured simply as the output gear 306, according to the configuration described above with respect to FIGS. 2 and 3. The mechanical feedback control assembly 1312 of the transmission 106 is representative of the central feedback drive assembly 806, as introduced above in the description corresponding to FIG. 8 and described in further detail with respect to FIG. 9. In this manner, the linkage indicated by arrow 1314 may couple the output gear 306 (not pictured in FIG. 13) of the second portion 1204 to a mechanical feedback input gear and carrier 902 of the mechanical feedback control assembly 1312. The linkage indicated by arrow 1314 may thus be configured as a chain, a belt, meshed gears, combinations thereof, and so forth.

The mechanical feedback control assembly 1312 is configured to operate similar to the operation of the central feedback drive assembly 806, as described in detail with respect to FIG. 9, such that rotational movement of the mechanical feedback input gear and carrier 902 of the mechanical feedback control assembly 1312 is translated to rotational motion of the bevel ring gear 912. In this manner, the mechanical feedback input gear and carrier 902 of the mechanical feedback drive assembly 1312 is driven by the output component 204 of the second portion 1204 when configured according to the example implementations illustrated in FIGS. 12 and 13, rather than controlled by the feedback gear cluster 1004 when configured according to the example implementation illustrated in FIGS. 7-11. Although not depicted in the example implementation 1300, the mechanical feedback control assembly 1312 thus further includes components of the central feedback drive assembly 806, such as the mechanical feedback drive gear 904, the one-way clutch 906, one or more mechanical feedback planet gears 908, the mechanical feedback output gear 910, and the bevel ring gear 912. Alternatively, in some implementations the mechanical feedback control assembly 1312 may exclude the one-way clutch 906 to enable the second portion 1204 to alter a direction in which the mechanical feedback input gear and carrier 902 rotates about the main axle 218, as described in further detail below.

Output of the mechanical feedback control assembly 1312 is then translated to a reference control sprocket 208 (not depicted in FIG. 13) of the central drive assembly 1316. In this manner, the central drive assembly 1316 is representative of an instance of the primary transmission assembly 708, as described above with respect to FIG. 7, which includes components introduced and described with respect to FIGS. 2-4. In this manner, the example configurations of the transmission 106 as described with respect to FIGS. 12 and 13 enable controlling output of the transmission 106 based on a combination of mechanical feedback received from an output component 204 of the apparatus implementing the transmission 106 as well as by mechanical override drive system 1310. As noted above, mechanical override drive system 1310 is actuated by at least one computing device in accordance with one or more implementations.

By configuring the transmission 106 according to the hybrid control configuration represented by example implementations 1200 and 1300, the transmission 106 is configured to provide additional degrees of control relative to the purely mechanical feedback-based control system as described relative to FIGS. 7-11. Furthermore, the hybrid control configuration represented by FIGS. 12 and 13 provide a fallback scenario in which a gradient of gear ratios determined based on purely mechanical feedback are preserved in a situation where the mechanical override drive system 1310 fails. Such a gradient of gear ratios is dependent on particular gear size(s) used to implement the second portion 1204.

In such an example scenario, where the mechanical override drive system 1310 fails, or is otherwise not actuated to cause rotation of the reference control sprocket 208 of the second portion 1204, the reference carrier 210 of the second portion 1204 is held still, and a maximum RPM of the output gear 306 of the second portion 1204 is achieved. The maximum RPM of the output gear 306 of the second portion 1204 consequently causes the mechanical feedback input gear and carrier 902 of the mechanical feedback drive assembly 1312 to achieve a high RPM, via linkage to the output gear 306 of the second portion 1204 indicated by arrow 1314. As described above with respect to FIGS. 9 and 10, the high rotational rate of the mechanical feedback input gear and carrier 902 causes a low rotational rate of the bevel ring gear 912, which decreases a rotational rate of the reference carrier 210 included in the central drive assembly 1316.

As described above, an output component 204 of the apparatus implementing the transmission 106 increases in RPM when the reference carrier 210 of the central drive assembly 1316 is held motionless and is increasingly applied torque as the reference carrier 210 of the central drive assembly 1316 decreases in its rotational rate. In this manner, the transmission 106 of the example implementations 1200 and 1300 is configured to cause the output component 204 of the apparatus implementing the transmission 106 to default to a high RPM in the event of failure of the mechanical override drive system 1310. In such an example scenario where the second portion 1204 does not provide output (e.g., where the mechanical coupling input sprocket 1308 is held stationary), the transmission 106 is controlled based on purely mechanical feedback.

The mechanical override drive system 1310 is configured to override this purely mechanical feedback-based control of the transmission 106 by controlling a rate and/or direction at which the reference control sprocket 208 of the second portion 1204 rotates about the secondary axle 1306. For instance, in an example scenario the control system 110 may control the transmission 106 to decrease an RPM of, and relieve an amount of torque applied to, an output component 204 of the apparatus 102 implementing the transmission 106. To do so, the mechanical override drive system 1310 is configured to actuate the reference control sprocket 208 of the second portion 1204 in a first direction (e.g., in a same rotational direction as the mechanical coupling input sprocket 1308) about the secondary axle 1306. As a rotational rate of the reference control sprocket 208 of the second portion 1204 increases in the first direction, assuming a constant rotational rate of the mechanical coupling input sprocket 1308, a rotational rate of the reference carrier 210 of the second portion 1204 increases in the first direction.

This increased rotation of the reference carrier 210 of the second portion 1204 in the first direction consequently decreases a rotational rate of the output gear 306 of the second portion 1204 in the first direction. Via linkage of the output gear 306 of the second portion 1204 to the mechanical feedback input gear and carrier 902, actuating the reference control sprocket 208 of the second portion 1204 in the first direction thus decreases a rotational rate of the mechanical feedback input gear and carrier 902 in the first direction, relative to a scenario where the reference control sprocket 208 of the second portion 1204 is held stationary. The decreased rotational rate in the first direction of the mechanical feedback input gear and carrier 902 of the mechanical feedback control assembly 1312 increases a rotational rate of the bevel ring gear 912 of the mechanical feedback control assembly 1312 in the first direction. The increased rotational rate of the bevel ring gear 912 in the first direction is causes an increase to a rotational rate, in the first direction, of the reference carrier 210 of the central drive assembly 1316. Specifically, the increased rotational rate of the bevel ring gear 912 of the mechanical feedback control assembly 1312 increases a rotational rate of the reference control sprocket 208 of the central drive assembly 1316, which in turn increases the rotational rate of the reference carrier 210 of the central drive assembly 1316.

As described above, the increased rotational rate of the reference carrier 210 included in the central drive assembly 1316 relieves a rotational rate of the output component 204 of the apparatus implementing the transmission 106. Stated differently, the increased rotational rate of the reference carrier 210 of the central drive assembly 1316 increases an amount of torque applied to the output component 204 of the apparatus implementing the transmission 106. In this manner, the transmission 106 of the example implementations 1200 and 1300 is configured to override purely mechanical feedback-based control of the transmission 106 by actuation of the reference control sprocket 208 of the second portion in the first direction, thus increasing an amount of torque applied to, and reducing an RPM of, the output component 204 of the apparatus 102 implementing the transmission 106. The configuration illustrated in the example implementations 1200 and 1300 is further configured to override the purely mechanical feedback-based control of the transmission 106 by increasing an RPM of, and decreasing an amount of torque applied to, the output component 204 of the apparatus 102 implementing the transmission 106.

To do so, the mechanical override drive system 1310 is configured to actuate the reference control sprocket 208 of the second portion 1204 in a second direction (e.g., in an opposite rotational direction as rotational movement of the mechanical coupling input sprocket 1308) about the secondary axle 1306. Increasing the rotational rate of the reference control sprocket 208 of the second portion 1204 in the second direction increases a rotational rate of the output gear 306 of the second portion 1204 in the first direction. As a rotational rate of the reference control sprocket 208 of the second portion 1204 increases in the second direction, assuming a constant rotational rate of the mechanical coupling input sprocket 1308, a rotational rate of the reference carrier 210 of the second portion 1204 increases in the second direction.

This increased rotation of the reference carrier 210 of the second portion 1204 in the second direction consequently decreases a rotational rate of the output gear 306 of the second portion 1204 relative to the second direction. Via linkage of the output gear 306 of the second portion 1204 to the mechanical feedback input gear and carrier 902, actuating the reference control sprocket 208 of the second portion 1204 in the second direction thus decreases a rotational rate of the mechanical feedback input gear and carrier 902 in the second direction. The decreased rotational rate of the mechanical feedback input gear and carrier 902 of the mechanical feedback control assembly 1312 consequently decreases a rotational rate of the bevel ring gear 912 of the mechanical feedback control assembly 1312 in the first direction. The decreased rotational rate of the bevel ring gear 912 in the first direction similarly decreases a rotational rate of the reference carrier 210 included in the central drive assembly 1316 relative to the first direction. Specifically, the decreased rotational rate of the bevel ring gear 912 of the mechanical feedback control assembly 1312 in the first direction decreases a rotational rate of the reference control sprocket 208 of the central drive assembly 1316 in the first direction, which in turn decreases the rotational rate of the reference carrier 210 of the central drive assembly 1316 in the first direction.

As described above, the rotational rate of the reference carrier 210 included in the central drive assembly 1316 correlates to the rotational rate of the output component 204 of the apparatus implementing the transmission 106. By decreasing the rotational rate of the reference carrier 210 in the first direction, an amount of torque applied to the output component 204 of the apparatus implementing the transmission 106 is also decreased, and an RPM of the output component 204 of the apparatus implementing the transmission 106 is increased. In this manner, the transmission 106 of the example implementations 1200 and 1300 is configured to override purely mechanical feedback-based control of the transmission 106 by actuation of the reference control sprocket 208 of the second portion in the second direction, thus decreasing an amount of torque applied to the output component 204 of the apparatus 102 in the first direction and increasing an RPM of the output component 204 of the apparatus 102 in the first direction.

Having described example implementations of transmissions, consider now some example procedures to illustrate techniques for controlling operation of the transmission in accordance with one or more implementations.

Example Procedures

This section describes example procedures for transmission control. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a control system, such as control system 110 of FIG. 1.

Figure 14:
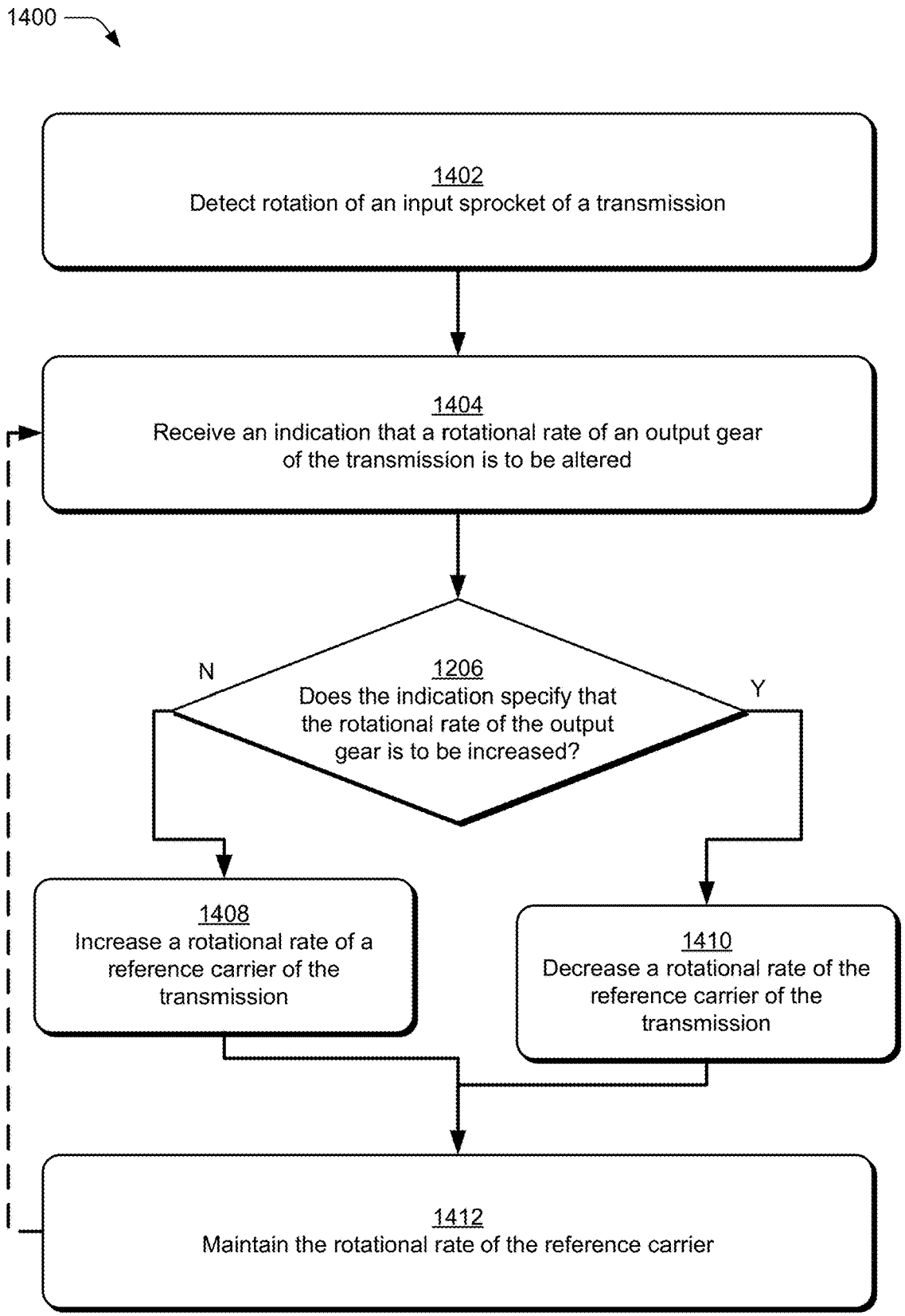
FIG. 14 depicts a procedure in an example implementation for controlling the transmission of FIG. 1.

FIG. 14 depicts a procedure 1400 in an example implementation in which a rotational rate of an output gear for a transmission is altered by actuating a reference carrier of the transmission.

Rotation of an input sprocket of a transmission is detected (block 1402). The control system 110, for instance, detects rotation of the main input sprocket 202 of the transmission 106, as actuated by a drive system 104 of the apparatus 102 incorporating the transmission 106. In accordance with one or more implementations, the drive system 104 may correspond to an internal combustion engine of the apparatus 102, a pedal system of the apparatus 102, a natural force exerted on the input main input sprocket 202 (e.g., water current, air flow, and the like), combinations thereof, and so forth.

An indication that a rotational rate of an output gear of the transmission is to be altered is then received (block 1404). The control system 110, for instance, may receive an indication that a rotational rate of the output gear 306 of the transmission 106 is to be altered. Such an indication may be received manually via user input to one or more controls of the apparatus 102 implementing the transmission 106, automatically and independent of user input based on mechanical feedback describing a rotational rate of an output component the apparatus 102 (e.g., the output component 204), or combinations thereof.

In response to receiving the indication that the rotational rate of the output gear of the transmission is to be altered, a determination is made as to whether the indication specifies that the rotational rate of the output gear is to be increased (block 1406). In response to determining that a rotational rate of the output gear of the transmission is to be decreased, a rotational rate of a reference carrier of the transmission is increased (block 1208). The control system 110, for instance, causes the control system 212 to actuate the control system sprocket 214 when the transmission 106 is implemented according to the configuration illustrated in FIG. 2. Actuation of the control system sprocket 214 subsequently causes actuation of the reference control sprocket 208, which controls a rotational rate of the reference carrier 210 about the main axle 218. As described herein, as the rotational rate of the reference carrier 210 increases, the rotational rate of the output gear 306 of the transmission 106 decreases, assuming a constant rotational rate of the input sprocket 114 (e.g., the main input sprocket 202) of the transmission 106.

In another example, when the transmission 106 is configured according to the example implementations illustrated and described with respect to FIGS. 12 and 13, the control system 110 is configured to actuate the reference control sprocket 208 of the second portion 1204 in a rotational direction that is the same as a rotational direction of the mechanical coupling input sprocket 1308 about the secondary axle 1306. Under the hybrid control configuration described with respect to FIGS. 12 and 13, actuation of the reference control sprocket 208 of the second portion 1204 in the same rotational direction of the mechanical coupling input sprocket 1308 causes a rotational rate of the reference carrier 210 of the second portion 1204 to increase in the same direction as the reference control sprocket 208 of the second portion 1204. Actuation of the reference control sprocket 208 of the second portion 1204 causes a decrease in the rotational rate of the mechanical feedback input gear and carrier 902 of the mechanical feedback control assembly 1312.

The decreased rotational rate in the first direction of the mechanical feedback input gear and carrier 902 of the mechanical feedback control assembly 1312 increases a rotational rate of the bevel ring gear 912 of the mechanical feedback control assembly 1312 in the first direction. The increased rotational rate of the bevel ring gear 912 in the first direction is causes an increase to a rotational rate, in the first direction, of the reference carrier 210 of the central drive assembly 1316. Specifically, the increased rotational rate of the bevel ring gear 912 of the mechanical feedback control assembly 1312 increases a rotational rate of the reference control sprocket 208 of the central drive assembly 1316, which in turn increases the rotational rate of the reference carrier 210 of the central drive assembly 1316.

As described above, the increased rotational rate of the reference carrier 210 included in the central drive assembly 1316 relieves a rotational rate of the output component 204 of the apparatus implementing the transmission 106. Stated differently, the increased rotational rate of the reference carrier 210 of the central drive assembly 1316 increases an amount of torque applied to the output component 204 of the apparatus implementing the transmission 106. In this manner, the transmission 106 of the example implementations 1200 and 1300 is configured to override purely mechanical feedback-based control of the transmission 106 by actuation of the reference control sprocket 208 of the second portion in the first direction, thus increasing an amount of torque applied to, and reducing an RPM of, the output component 204 of the apparatus 102 implementing the transmission 106.

Alternatively, responsive to determining that the indication specifies that the rotational rate of the output gear is to be increased, a rotational rate of the reference carrier of the transmission is decreased (block 1410). The control system 110, for instance, causes the control system 212 to restrict movement of the control system sprocket 214 when the transmission 106 is implemented according to the configuration illustrated in FIG. 2. Restricting movement of the control system sprocket 214 restricts movement of the reference control sprocket 208, which controls a rotational rate of the reference carrier 210 about the main axle 218. As described herein, as the rotational rate of the reference carrier 210 decreases, the rotational rate of the output gear 306 of the transmission 106 increases, assuming a constant rotational rate of the input sprocket 114 (e.g., the main input sprocket 202) of the transmission 106.

In another example, when the transmission 106 is configured according to the example implementations illustrated and described with respect to FIGS. 12 and 13, the control system 110 is configured to actuate the reference control sprocket 208 of the second portion 1204 in a rotational direction that is the opposite a rotational direction of the mechanical coupling input sprocket 1308 about the secondary axle 1306. Under the hybrid control configuration described with respect to FIGS. 12 and 13, the mechanical override drive system 1310 is configured to actuate the reference control sprocket 208 of the second portion 1204 in a second direction (e.g., in an opposite rotational direction as rotational movement of the mechanical coupling input sprocket 1308) about the secondary axle 1306. Increasing the rotational rate of the reference control sprocket 208 of the second portion 1204 in the second direction increases a rotational rate of the output gear 306 of the second portion 1204 in the first direction. As a rotational rate of the reference control sprocket 208 of the second portion 1204 increases in the second direction, assuming a constant rotational rate of the mechanical coupling input sprocket 1308, a rotational rate of the reference carrier 210 of the second portion 1204 increases in the second direction.

This increased rotation of the reference carrier 210 of the second portion 1204 in the second direction consequently decreases a rotational rate of the output gear 306 of the second portion 1204 relative to the second direction. Via linkage of the output gear 306 of the second portion 1204 to the mechanical feedback input gear and carrier 902, actuating the reference control sprocket 208 of the second portion 1204 in the second direction thus decreases a rotational rate of the mechanical feedback input gear and carrier 902 in the second direction. The decreased rotational rate of the mechanical feedback input gear and carrier 902 of the mechanical feedback control assembly 1312 consequently decreases a rotational rate of the bevel ring gear 912 of the mechanical feedback control assembly 1312 in the first direction. The decreased rotational rate of the bevel ring gear 912 in the first direction similarly decreases a rotational rate of the reference carrier 210 included in the central drive assembly 1316 relative to the first direction. Specifically, the decreased rotational rate of the bevel ring gear 912 of the mechanical feedback control assembly 1312 in the first direction decreases a rotational rate of the reference control sprocket 208 of the central drive assembly 1316 in the first direction, which in turn decreases the rotational rate of the reference carrier 210 of the central drive assembly 1316 in the first direction.

As described above, the rotational rate of the reference carrier 210 included in the central drive assembly 1316 correlates to the rotational rate of the output component 204 of the apparatus implementing the transmission 106. By decreasing the rotational rate of the reference carrier 210 in the first direction, an amount of torque applied to the output component 204 of the apparatus implementing the transmission 106 is also decreased, and an RPM of the output component 204 of the apparatus implementing the transmission 106 is increased. In this manner, the transmission 106 of the example implementations 1200 and 1300 is configured to override purely mechanical feedback-based control of the transmission 106 by actuation of the reference control sprocket 208 of the second portion in the second direction, thus decreasing an amount of torque applied to the output component 204 of the apparatus 102 in the first direction and increasing an RPM of the output component 204 of the apparatus 102 in the first direction.

The rotational rate of the reference carrier is maintained (block 1212). In accordance with one or more implementations, the rotational rate of the reference carrier 210 of the transmission 106 is maintained until receiving a subsequent indication that a rotational rate of the output gear 306 of the transmission 106 is to be altered, as indicated by the dashed arrow returning to block 1204 from block 1212. In this manner, the operations described in blocks 1204, 1206, 1208, 1210, and 1212 can be performed during operation of the apparatus 102 implementing the transmission 106.

Having described example procedures in accordance with one or more implementations, consider now an example system and device that can be utilized to implement the various techniques described herein.

Example Control System and Device

Figure 15:
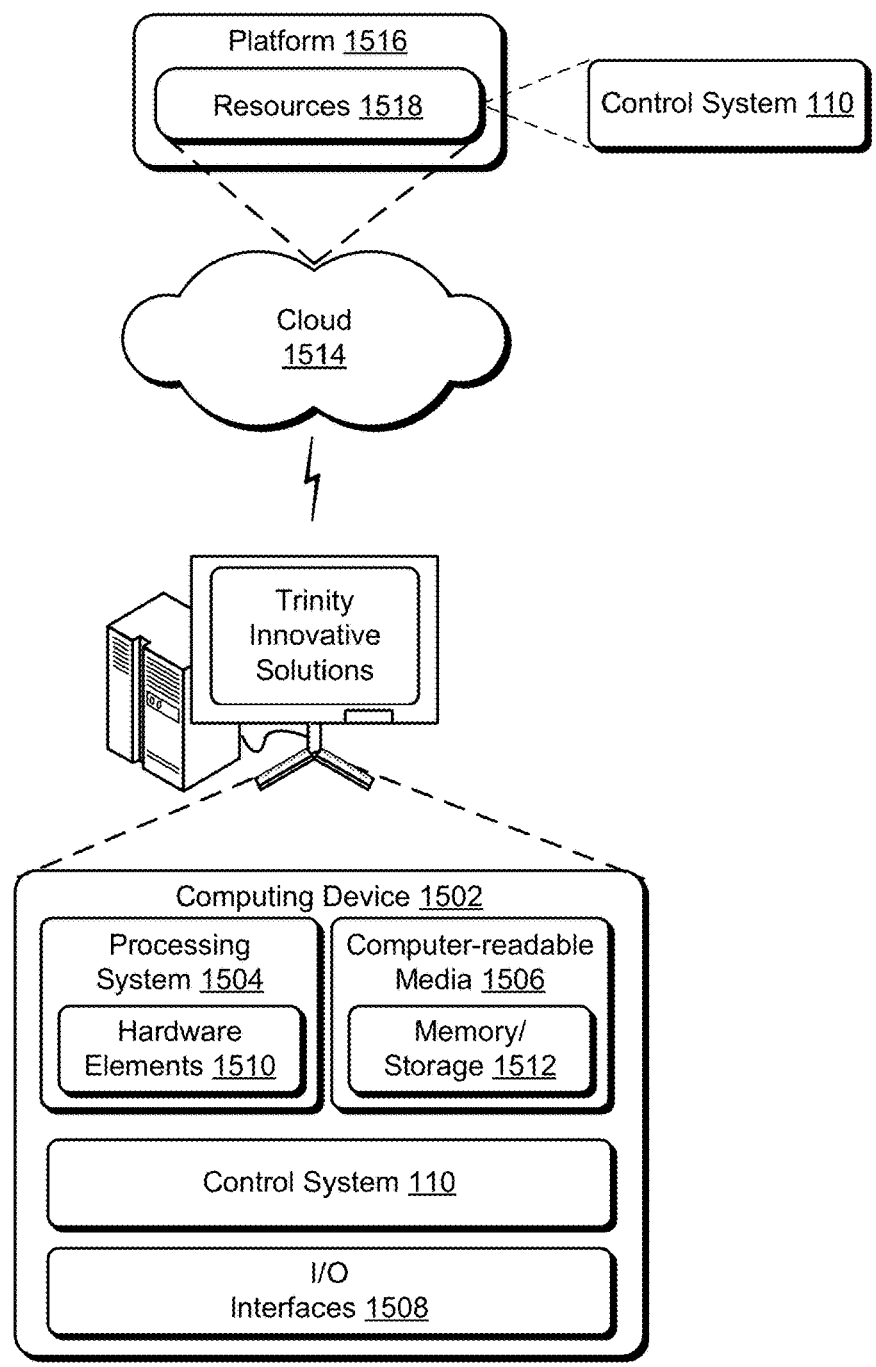
FIG. 15 illustrates an example system that includes an example computing device that is representative of one or more computing systems and/or devices that may implement the various techniques described herein.

FIG. 15 illustrates an example system generally at 1500 that includes an example computing device 1502 that is representative of one or more computing systems and/or devices that may implement the various techniques described herein. This is illustrated through inclusion of the control system 110. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interfaces 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware elements 1510 that may be configured as processors, functional blocks, and so forth. This may include implementation in hardware as an application-specific integrated circuit or other logic device formed using one or more semiconductors. The hardware elements 1510 are not limited by the materials from which they are formed or the processing mechanisms employed therein. For example, processors may comprise semiconductor(s) and/or transistors (e.g., electronic integrated circuits (ICs)). In such a context, processor-executable instructions may be electronically-executable instructions.

The computer-readable media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, combinations thereof, and so forth) as well as removable media (e.g., Flash memory, a removable hard drive, an optical disc, combinations thereof, and so forth). The computer-readable media 1506 may be configured in a variety of other manners, as described in further detail below.

Input/output interface(s) 1508 are representative of functionality to enable a user to enter commands and/or information to computing device 1502, and to enable information to be presented to the user and/or other components or devices using various input/output devices. Examples of input devices include a throttle control, a keyboard, a cursor control device (e.g., a mouse), a microphone, touch functionality (e.g., capacitive or other sensors configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), one or more speakers, a printer, a network card, a tactile-response device, and so forth. Thus, the computing device 1502 may be configured in a variety of ways as further described below to support user interaction.

Various techniques may be described herein in the general context of software, hardware elements, or program modules. Generally, program modules include routines, programs, objects, elements, components, data structures, and so forth that perform particular tasks or implement particular abstract data types. The terms "module," "functionality," and "component" as used herein generally represent software, firmware, hardware, or combinations thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" refers to media and/or devices that enable persistent and/or non-transitory storage of information, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described herein.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

Conclusion

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:
1. A transmission comprising:
an input sprocket configured to rotate a main axle at a rate controlled by a drive system of a vehicle;
a reference control sprocket coupled to the main axle by a floating bearing and configured to rotate at a rate that is independent of the rate at which the input sprocket rotates the main axle;
a mechanical feedback assembly configured to control the rate at which the reference control sprocket rotates based on a current rotational rate of an output component of the vehicle;
a reference carrier coupled to the main axle by a floating bearing and configured to rotate about the main axle at a rate controlled by the reference control sprocket, the reference carrier carrying a plurality of planetary gear clusters, each planetary gear cluster being coupled to an input sun gear and an output gear by a planetary shaft that passes through the reference carrier, the input sun gear rotating at the same rate as the input sprocket and the plurality of planetary gear clusters enabling the reference carrier to rotate about the main axle at a rate that differs from a rotational rate of the output gear; and
the output gear configured to cause rotation of the output component of the vehicle.

2. The transmission of claim 1, wherein a rate at which the output gear rotates relative to the rate at which the input sprocket rotates is inversely proportional to the rate at which the reference carrier rotates about the main axle.

3. The transmission of claim 1, wherein the input sprocket, the reference control sprocket, and the reference carrier are configured to rotate in the same direction.

4. The transmission of claim 1, wherein the main axle is configured as a solid rod that does not include a groove, a spline, or a hollow portion.

5. The transmission of claim 1, wherein the mechanical feedback assembly includes a worm gear control, a worm gear, and a worm gear sprocket, the worm gear control being configured to cause rotation of the worm gear about an axis that is generally perpendicular to the main axle, the worm gear being coupled to the worm gear sprocket and the worm gear sprocket controlling the rate at which the reference control sprocket rotates.

6. The transmission of claim 1, wherein the reference control sprocket is connected to the reference carrier via a one-way clutch such that the rate at which the reference control sprocket rotates is not influenced by the rate at which the reference carrier rotates.

7. The transmission of claim 1, wherein the mechanical feedback assembly comprises:
 a feedback gear mounted to the output component of the vehicle; and
 a feedback gear cluster configured to transfer power from the feedback gear to the reference control sprocket.

8. A transmission comprising:
 an input component configured to rotate a main axle at a rate controlled by a motor of an apparatus;
 a reference control component coupled to the main axle by a floating bearing and configured to rotate at a rate that is independent of the rate at which the input component rotates the main axle;
 a mechanical feedback assembly configured to control the rate at which the reference control component rotates based on a current rotational rate of an output component of the apparatus;
 a reference carrier coupled to the main axle by a floating bearing and configured to rotate about the main axle at a rate controlled by the reference control component, the reference carrier carrying a plurality of planetary gear clusters, each planetary gear cluster being coupled to an input sun gear and an output gear by a planetary shaft that passes through the reference carrier, the input sun gear rotating at the same rate as the input component and the plurality of planetary gear clusters enabling the reference carrier to rotate about the main axle at a rate that differs from a rotational rate of the output gear; and
 the output gear configured to cause rotation of the output component of the apparatus.

9. The transmission of claim 8, wherein the input component is a sprocket, the reference control component is a sprocket, and a rate at which the output gear rotates relative to the rate at which the input component rotates is inversely proportional to the rate at which the reference carrier rotates about the main axle.

10. The transmission of claim 8, wherein the input component, the reference control component, and the reference carrier are configured to rotate in the same direction.

11. The transmission of claim 8, wherein the main axle is configured as a solid rod that does not include a groove, a spline, or a hollow portion.

12. The transmission of claim 8, wherein the mechanical feedback assembly includes a worm gear control, a worm gear, and a worm gear sprocket, the worm gear control being configured to cause rotation of the worm gear about an axis that is generally perpendicular to the main axle, the worm gear being coupled to the worm gear sprocket and the worm gear sprocket controlling the rate at which the reference control component rotates.

13. The transmission of claim 8, wherein the reference control component is connected to the reference carrier via a one-way clutch such that the rate at which the reference control component rotates is not influenced by the rate at which the reference carrier rotates.

14. The transmission of claim 8, wherein the mechanical feedback assembly comprises:
 a feedback gear mounted to the output component of the apparatus; and
 a feedback gear cluster configured to transfer power from the feedback gear to the reference control component.

15. A transmission comprising:
 an input component configured to rotate a main axle of an apparatus;
 a reference control component coupled to the main axle by a floating bearing and configured to rotate at a rate that is independent of a rate at which the input component rotates the main axle;
 a mechanical feedback assembly configured to control the rate at which the reference control component rotates based on a current rotational rate of an output component of the apparatus;
 a reference carrier coupled to the main axle by a floating bearing and configured to rotate about the main axle at a rate controlled by the reference control component, the reference carrier carrying a plurality of planetary gear clusters, each planetary gear cluster being coupled to an input sun gear and an output gear by a planetary shaft that passes through the reference carrier, the input sun gear rotating at the same rate as the input component and the plurality of planetary gear clusters enabling the reference carrier to rotate about the main axle at a rate that differs from a rotational rate of the output gear; and
 the output gear configured to cause rotation of the output component of the apparatus.

16. The transmission of claim 15, wherein the input component is a sprocket, the reference control component is a sprocket, and a rate at which the output gear rotates relative to the rate at which the input component rotates is inversely proportional to the rate at which the reference carrier rotates about the main axle.

17. The transmission of claim 15, wherein the input component, the reference control component, and the reference carrier are configured to rotate in the same direction.

18. The transmission of claim 15, wherein the main axle is configured as a solid rod that does not include a groove, a spline, or a hollow portion.

19. The transmission of claim 15, wherein the mechanical feedback assembly includes a worm gear control, a worm gear, and a worm gear sprocket, the worm gear control being configured to cause rotation of the worm gear about an axis that is generally perpendicular to the main axle, the worm gear being coupled to the worm gear sprocket and the worm gear sprocket controlling the rate at which the reference control component rotates.

20. The transmission of claim 15, wherein the reference control component is connected to the reference carrier via a one-way clutch such that the rate at which the reference control component rotates is not influenced by the rate at which the reference carrier rotates.

* * * * *